United States Patent
Inatomi et al.

(10) Patent No.: US 9,049,191 B2
(45) Date of Patent: Jun. 2, 2015

(54) BIOMETRIC AUTHENTICATION SYSTEM, COMMUNICATION TERMINAL DEVICE, BIOMETRIC AUTHENTICATION DEVICE, AND BIOMETRIC AUTHENTICATION METHOD

(75) Inventors: Yasuaki Inatomi, Kanagawa (JP); Atsushi Minemura, Tokyo (JP); Michiru Yokobori, Kanagawa (JP); Hayashi Ito, Chiba (JP); Takeshi Fujimatsu, Kanagawa (JP); Manabu Inuma, Tokyo (JP); Akira Otsuka, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 310 days.

(21) Appl. No.: 13/822,815

(22) PCT Filed: Sep. 16, 2011

(86) PCT No.: PCT/JP2011/005245
§ 371 (c)(1),
(2), (4) Date: Mar. 13, 2013

(87) PCT Pub. No.: WO2012/042775
PCT Pub. Date: Apr. 5, 2012

(65) Prior Publication Data
US 2013/0174243 A1    Jul. 4, 2013

(30) Foreign Application Priority Data
Sep. 30, 2010   (JP) ................. 2010-221379

(51) Int. Cl.
*H04L 29/06* (2006.01)
*H04L 9/32* (2006.01)
*G06F 21/32* (2013.01)

(52) U.S. Cl.
CPC .......... *H04L 63/0861* (2013.01); *H04L 9/3231* (2013.01); *H04L 2209/04* (2013.01); *H04L 2209/34* (2013.01); *G06F 21/32* (2013.01)

(58) Field of Classification Search
CPC .... H04L 63/0861; H04L 9/3231; G06F 21/32
USPC .............................. 726/1–7, 21; 713/182–186
See application file for complete search history.

(56) References Cited

U.S. PATENT DOCUMENTS 7,840,034 B2 * 11/2010 Takahashi et al. ............ 382/116
8,412,940 B2 *  4/2013 Takahashi et al. ............ 713/168

(Continued)

FOREIGN PATENT DOCUMENTS

CN    101087194 A    12/2007
JP    2002-297551 A   10/2002

(Continued)

OTHER PUBLICATIONS

C.P.Schnorr, "Efficient signature generation by smart cards," Journal of Cryptology, 4(3), pp. 161-174, 1991.

(Continued)

*Primary Examiner* — Andrew Goldberg
*Assistant Examiner* — Carlos Amorin
(74) *Attorney, Agent, or Firm* — Pearne & Gordon LLP

(57) ABSTRACT

Provided is a biometric authentication system capable of preventing spoofing attacks even if leakage of key information and a registration conversion template occurs. A communication terminal device (300) calculates secret key information k' which is exclusive OR of key information k of the registration biological information and masked value c' which is randomly selected from a predetermined error correction code group, and calculates verified information c''' which is exclusive OR of sent information c'' and value c'. A biometric authentication device (500) calculates exclusive OR of authentication biological information, information k', and registration conversion template w, as information c'', wherein the template w is exclusive OR of information x, information k, and authentication parameter c randomly selected from the code group; and performs biometric authentication on the basis of a degree of matching between information c''' corresponding to information c'', and the parameter c.

8 Claims, 21 Drawing Sheets

(56) References Cited

U.S. PATENT DOCUMENTS

| | | | |
|---|---|---|---|
| 8,443,201 B2* | 5/2013 | Takahashi et al. | 713/186 |
| 2007/0038867 A1* | 2/2007 | Verbauwhede et al. | 713/186 |
| 2007/0286465 A1 | 12/2007 | Takahashi et al. | |
| 2008/0072063 A1* | 3/2008 | Takahashi et al. | 713/186 |
| 2008/0178002 A1* | 7/2008 | Hirata et al. | 713/168 |
| 2008/0178008 A1* | 7/2008 | Takahashi et al. | 713/186 |
| 2011/0099385 A1* | 4/2011 | Takahashi | 713/186 |
| 2012/0005736 A1* | 1/2012 | Takahashi et al. | 726/7 |

FOREIGN PATENT DOCUMENTS

| | | |
|---|---|---|
| JP | 2007-328502 A | 12/2007 |
| JP | 2008-97438 A | 4/2008 |

OTHER PUBLICATIONS

Kenta Takahashi, et al., "A Protocol for Secure Remote Authentication Using Biometrics", [CD-ROM] IPSJ Journal, Sep. 15, 2008, vol. 49, No. 9, pp. 3016-3027.

International Search Report for PCT/JP2011/005245.

* cited by examiner

BIOMETRIC AUTHENTICATION SYSTEM, COMMUNICATION TERMINAL DEVICE, BIOMETRIC AUTHENTICATION DEVICE, AND BIOMETRIC AUTHENTICATION METHOD

TECHNICAL FIELD

The present invention relates to a biometric authentication system that authenticates a person using biometric information of the person to be biometrically authenticated and a communication terminal apparatus owned by the person, a communication terminal apparatus, a biometric authentication apparatus, and a method of biometric authentication used in the biometric authentication system.

BACKGROUND ART

Biometric authentication systems that authenticate persons using biometric information such as irises, fingerprints, veins or voiceprints have been used in various applications such as entry to or exit from data centers, login to PCs, and bank transactions.

Since the biometric information is body-specific characteristics and invariable, it cannot be discarded or updated even in case of leak. Thus, in recent years, cancelable biometrics has been proposed as a biometric authentication technique that can perform the biometric authentication with reduced risk of leak of the biometric information itself.

In a common type of cancelable biometrics, a registration apparatus first generates a registration conversion template at the time of registration. Specifically, the registration apparatus converts the feature value of the biometric information (referred to herein as "registered biometric information") using secret key information stored in a communication terminal apparatus owned by a person providing the biometric information (referred to hereinafter as a "user") to generate the registration conversion template. The registration apparatus then registers the generated registration conversion template into an authentication server.

On the contrary, a biometric authentication apparatus generates an authentication conversion template at the time of authentication. Specifically, the biometric authentication apparatus also converts the feature value of the biometric information obtained from a person asking for biometric authentication (referred to herein as "biometric information at the time of authentication") using the key information acquired from the communication terminal apparatus of the user to generate the authentication conversion template. The biometric authentication apparatus then checks the generated authentication conversion template against the registration conversion template registered in the authentication server. The term "conversion template" is used hereinafter to indicate the generic term or either of the registration conversion template and the authentication conversion template.

Thus the biometric authentication apparatus can perform authentication by checking the authentication conversion template against the registration conversion template. The authentication server only manages the conversion templates rather than the feature value of the biometric information. Accordingly, the cancelable biometrics can avoid the risk of leak of the biometric information itself.

Unfortunately, the above technology may be subject to "spoofing attacks" in case of leak of the registration conversion template or the authentication conversion template. The "spoofing attack" indicates that a malicious third party sends a conversion template to the authentication server and passes through the authentication by impersonating a user.

This defect is caused by significantly high similarity between the registration conversion template and the authentication conversion template. The reason for the similarity between these templates is as follows: Registered biometric information, i.e. original information of the registration conversion template, and biometric information at the time of authentication, i.e. original information of the authentication conversion template, are acquired from the same user, so that they are significantly similar to each other; and this technology generates the registration conversion template and the authentication conversion template using the same conversion scheme and key. The authentication conversion template is therefore significantly similar to the registration conversion template.

Accordingly, a malicious third party could pass through authentication only by acquiring either of the two templates and inputting it to a biometric authentication apparatus without obtaining a communication terminal apparatus owned by the user or secret key information stored in the communication terminal apparatus.

For example, Patent Literature (hereinafter, abbreviated as PTL) 1 describes a technique that can prevent spoofing attacks in case of leak of the conversion template as a countermeasure.

According to the technique disclosed in PTL 1, the biometric authentication apparatus generates a random value and transmits the random value to a communication terminal apparatus in concealment during authenticating. The communication terminal apparatus converts the above-described key information using the random value to transmit it to the biometric authentication apparatus. The biometric authentication apparatus generates biometric information at the time of authentication using the converted key information and checks it against the registration conversion template stored in the authentication server using the above-described random value. Thus, the technique disclosed in PTL 1 can make the authentication conversion template different from the registration conversion template, thereby preventing the spoofing attacks even in case of leak of either of the conversion templates.

CITATION LIST

Patent Literature

PTL 1
Japanese Patent Application Laid-Open No. 2008-97438

Non-Patent Literature

NPL 1
C. P. Schnorr, "Efficient signature generation by smart cards," Journal of Cryptology, 4(3), pp. 161-174, 1991

SUMMARY OF INVENTION

Technical Problem

Unfortunately, according to the technique disclosed in PTL 1, the authentication server managing registration conversion templates, which is operated in an open environment on a lower security level, compared to dedicated networks and servers, such as the Internet and the cloud, has an increased risk of the spoofing attacks.

The reason is as follows: The technique disclosed in PTL 1 converts the registered biometric information using the secret key information stored in the communication terminal apparatus, and then registers it as the registration conversion template into the authentication server. If such a technique is used in an open environment such as the Internet, the registration conversion templates to be managed may be illegally acquired by hacking using brute-force attacks from multiple computers. In addition, if the key information is leaked or a malicious third party illegally acquires the key information, both of the registration conversion template and the key information are provided, and corresponding registered biometric information is easily restored. Upon restoration of the registered biometric information, the malicious third party can fully impersonate a user himself. That is, the malicious third party may pass through the authentication by impersonating the user himself.

An object of the present invention is to provide a biometric authentication system, a communication terminal apparatus, a biometric authentication apparatus, and a method of biometric authentication that can prevent spoofing attacks in case of leak of key information and a registration conversion template stored in the communication terminal apparatus.

Solution to Problem

A biometric authentication system according to an aspect of the present invention includes: a communication terminal apparatus owned by a user subjected to biometric authentication; and a biometric authentication apparatus that performs the biometric authentication, the communication terminal apparatus including: a registered information storing section that stores key information issued in association with biometric information at the time of registration of the user; a key concealment section that performs an exclusive OR operation of the stored key information and a first error correction code to calculate key concealment information, the first error correction code being randomly selected from a predetermined error correction code group; and an authentication parameter extracting section that performs an exclusive OR operation of the error corrected information transmitted from the biometric authentication apparatus and the first error correction code to calculate information to be verified, the biometric authentication apparatus comprising: an authentication biometric information acquiring section that acquires biometric information at the time of authentication from a person asking for biometric authentication; an authentication information acquiring section that acquires the key concealment information from the communication terminal apparatus owned by the person; an error correction processing section that calculates the error corrected information on the basis of an exclusive OR of the acquired biometric information at the time of the authentication, the acquired key concealment information, and a registration conversion template being an exclusive OR of the biometric information at the time of the registration, the key information, and a second error correction code randomly selected from the error correction code group; and a verification processing section that transmits the calculated error corrected information to the communication terminal apparatus and performs the biometric authentication on the basis of the degree of identity between the information to be verified that is calculated on the basis of the error corrected information and the second error correction code used to calculate the error corrected information.

A communication terminal apparatus according an aspect of the present invention is an apparatus that is used in a biometric authentication system including the communication terminal apparatus owned by a user subjected to biometric authentication and a biometric authentication apparatus that performs the biometric authentication, the communication terminal apparatus including: a registered information storing section that stores key information issued in association with biometric information at the time of registration of the user; a key concealment section that performs an exclusive OR operation of the stored key information and a first error correction code to calculate key concealment information and transmits the calculated key concealment information to the biometric authentication apparatus, the first error correction code being randomly selected from a predetermined error correction code group; an authentication parameter extracting section that acquires error corrected information calculated on the basis of an exclusive OR of biometric information at the time of authentication acquired by the biometric authentication apparatus when the user asks for the biometric authentication, the transmitted key concealment information, and a registration conversion template being the exclusive OR of the biometric information at the time of the registration, the key information and a second error correction code randomly selected from the error correction code group, and performs an exclusive OR operation of the acquired error corrected information and the first error correction code to calculate information to be verified; and a verification information generating section that generates information obtained by concealing the calculated information to be verified, as information for verification, and transmits the generated information for verification to the biometric authentication apparatus.

A biometric authentication apparatus according to an aspect of the present invention is an apparatus used in a biometric authentication system including a communication terminal apparatus owned by a user subjected to biometric authentication and the biometric authentication apparatus that performs the biometric authentication, the biometric authentication apparatus including: an authentication biometric information acquiring section that acquires biometric information at the time of authentication from a person asking for biometric authentication; an authentication information acquiring section that acquires key concealment information from a communication terminal apparatus owned by the person; an error correction processing section that calculates error corrected information on the basis of an exclusive OR of the acquired biometric information at the time of the authentication, the acquired key concealment information, and a registration conversion template being an exclusive OR of the biometric information at the time of registration, key information issued in association with the biometric information at the time of the registration and a second error correction code randomly selected from an error correction code group; and a verification processing section that transmits the calculated error corrected information to the communication terminal apparatus, and performs the biometric authentication on the basis of the degree of identity between the information to be verified that is calculated by the communication terminal apparatus in response to the transmission and the second error correction code used to generate the registration conversion template.

A method of biometric authentication according to an aspect of the present invention is a method used in a biometric authentication system including a communication terminal apparatus owned by a user subjected to biometric authentication and a biometric authentication apparatus that performs the biometric authentication, the method of biometric authentication including: performing an exclusive OR operation of key information issued in association with biometric information at the time of registration of the user and a first error correction code to calculate key concealment information in the communication terminal apparatus, the first error correction code being randomly selected from a predetermined error correction code group; acquiring biometric information at the time of authentication from a person asking for biometric authentication, acquiring the key concealment information from the communication terminal apparatus owned by the person, and calculating error corrected information on the basis of an exclusive OR of the acquired biometric information at the time of the authentication, the acquired key concealment information, and a registration conversion template being the exclusive OR of the biometric information at the time of the registration, the key information and a second error correction code randomly selected from the error correction code group, in the biometric authentication apparatus; performing an exclusive OR operation of the error corrected information transmitted from the biometric authentication apparatus and the first error correction code to calculate information to be verified, and transmitting information for verification calculated from the information to be verified to the biometric authentication apparatus, in the communication terminal apparatus; and performing the biometric authentication on the basis of the degree of identity between the information for verification calculated on the basis of the transmitted error corrected information and the second error correction code used to calculate the error corrected information, in the biometric authentication apparatus.

Advantageous Effects of Invention

According to the present invention, spoofing attacks can be prevented in case of leak of the key information and the registration conversion templates stored in the communication terminal apparatus.

DESCRIPTION OF EMBODIMENTS

The embodiments of the present invention will now be described in detail with reference to the attached drawings.

Embodiment 1

The configuration of a biometric authentication system according to Embodiment 1 of the present invention is first described.

Figure 1:
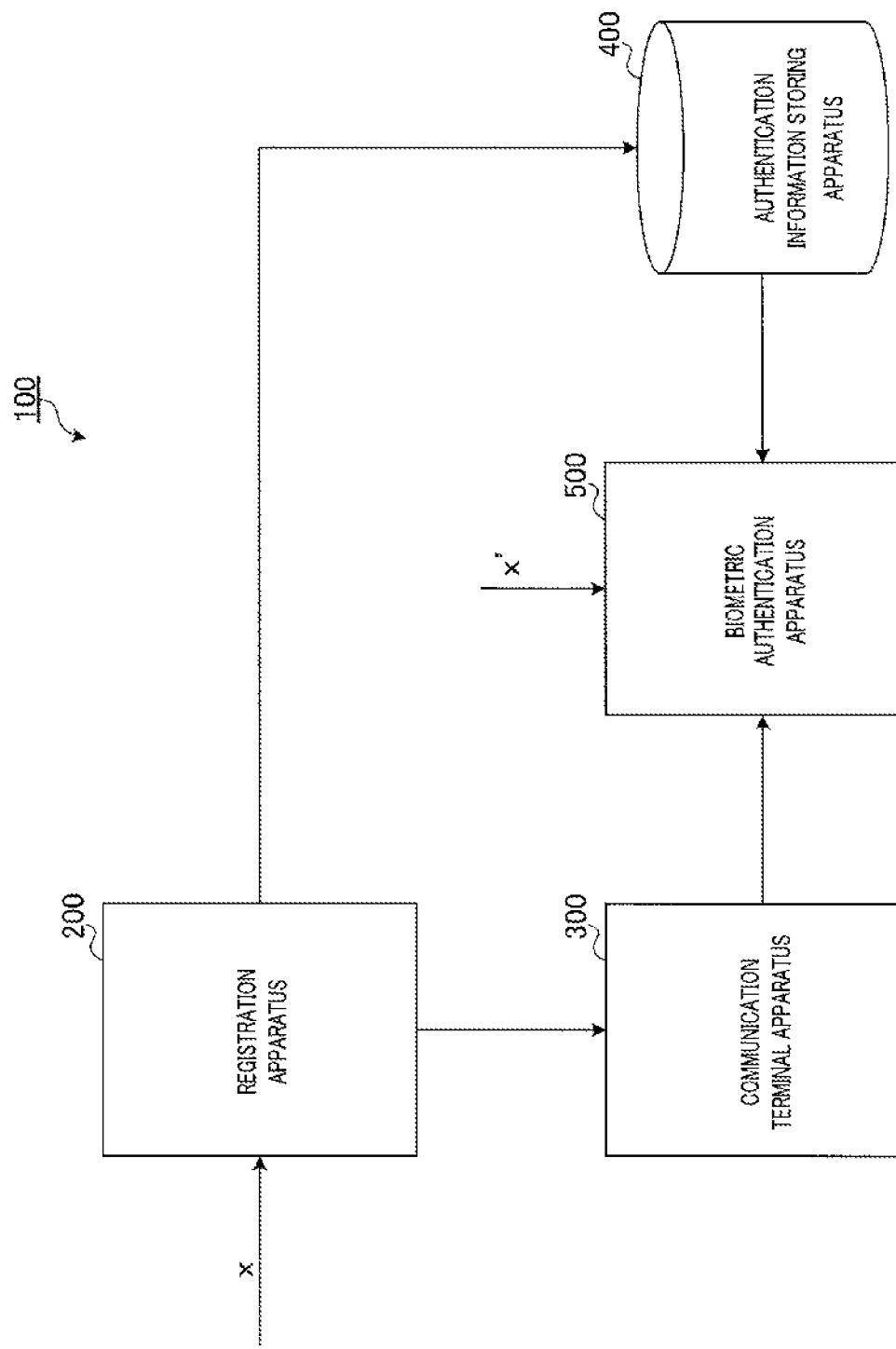
FIG. 1 is a configuration diagram illustrating a biometric authentication system according to Embodiment 1 of the present invention.

FIG. 1 is a configuration diagram illustrating the biometric authentication system according to the present Embodiment.

In FIG. 1, biometric authentication system 100 includes registration apparatus 200, communication terminal apparatus 300, authentication information storing apparatus 400, and biometric authentication apparatus 500.

In the registration phase, each time registration apparatus 200 acquires registered biometric information x from a user to be biometrically authenticated, it issues key information k, at which time registration apparatus 200 randomly selects one of a predetermined error correction code group as authentication parameter (second error correction code) c.

The biometric information is a feature amount such as an iris, a fingerprint, a vein, a voiceprint, or a face. The present embodiment is described as an example where the iris is used as the biometric information.

Registration apparatus 200 performs an exclusive OR operation of registered biometric information x, key information k, and authentication parameter c to calculate registration conversion template w. In addition, registration apparatus 200 generates public key information W obtained by concealing authentication parameter c. Authentication parameter c is then deleted, and registration conversion template w and public key information W (authentication information) are stored in authentication information storing apparatus 400.

Communication terminal apparatus 300, which is for example a mobile phone owned by a user, can communicate with registration apparatus 200 and biometric authentication apparatus 500 via a wireless or wired connection. In the registration phase, communication terminal apparatus 300 acquires key information k issued in association with registered biometric information x of the user, and stores it. Communication terminal apparatus 300 also randomly selects one of a predetermined error correction code group as mask value (first error correction code) c' in the pre-authentication phase or the authentication phase. Communication terminal apparatus 300 then performs an exclusive OR operation of key information k and mask value c' to calculate key concealment information k'.

In the authentication phase, when error corrected information described later is transmitted from biometric authentication apparatus 500, communication terminal apparatus 300 also performs an exclusive OR operation of the error corrected information and mask value c' to calculate information c''' to be verified. Communication terminal apparatus 300 then transmits information obtained by concealing calculated information c''' to be verified to biometric authentication apparatus 500 as verification information Y and z.

Authentication information storing apparatus 400, which is for example a server on the network of a banking system, can communicate with registration apparatus 200 and biometric authentication apparatus 500 via a wireless or wired connection. Authentication information storing apparatus 400 stores registration conversion templates w and public key information W generated in the registration phase, and holds them until the authentication phase.

Biometric authentication apparatus 500, which is for example an ATM (Automated Teller Machine) at a bank, performs personal authentication (i.e., verification whether a user himself is registered) of a user on the basis of biometric information of the user. In the authentication phase, each time biometric authentication apparatus 500 acquires biometric information x' 26 at the time of authentication from a person asking for the biometric authentication (referred to hereinafter as an "authenticatee"), it acquires key concealment information k' from a communication terminal apparatus owned by the authenticatee. Objects providing the key concealment information k' may include those (for example, communication terminal apparatuses owned by malicious third parties) that are not communication terminal apparatuses 300 according to the present invention.

Biometric authentication apparatus 500 calculates the above error corrected information c'' on the basis of an exclusive OR of biometric information x' at the time of authentication, key concealment information k', and registration conversion template w stored in authentication information storing apparatus 400 to transmit it to the communication terminal apparatus owned by the authenticatee. Biometric authentication apparatus 500 determines the coincidence between the above information c''' to be verified and authentication parameter c on the basis of the above verification information Y and z returned from the communication terminal apparatus, and the above public key information W.

If the registered biometric information and the biometric information at the time of authentication are very similar to each other, information c''' to be verified coincides with authentication parameter c. Accordingly, such biometric authentication system 100 can determine the degree of the identity between the registered biometric information and the biometric information at the time of authentication on the basis of the coincidence of information c''' to be verified and authentication parameter c. Thus, even if key information k stored in communication terminal apparatus 300 in addition to registration conversion template w is leaked, biometric authentication system 100 can prevent a malicious third party from acquiring authentication parameter c. Biometric authentication system 100 can also prevent the registered biometric information from being restored from registration conversion template w and key information k. As a result, biometric authentication system 100 can prevent spoofing attacks.

An overview of biometric authentication in biometric authentication system 100 is now described.

Figure 2:
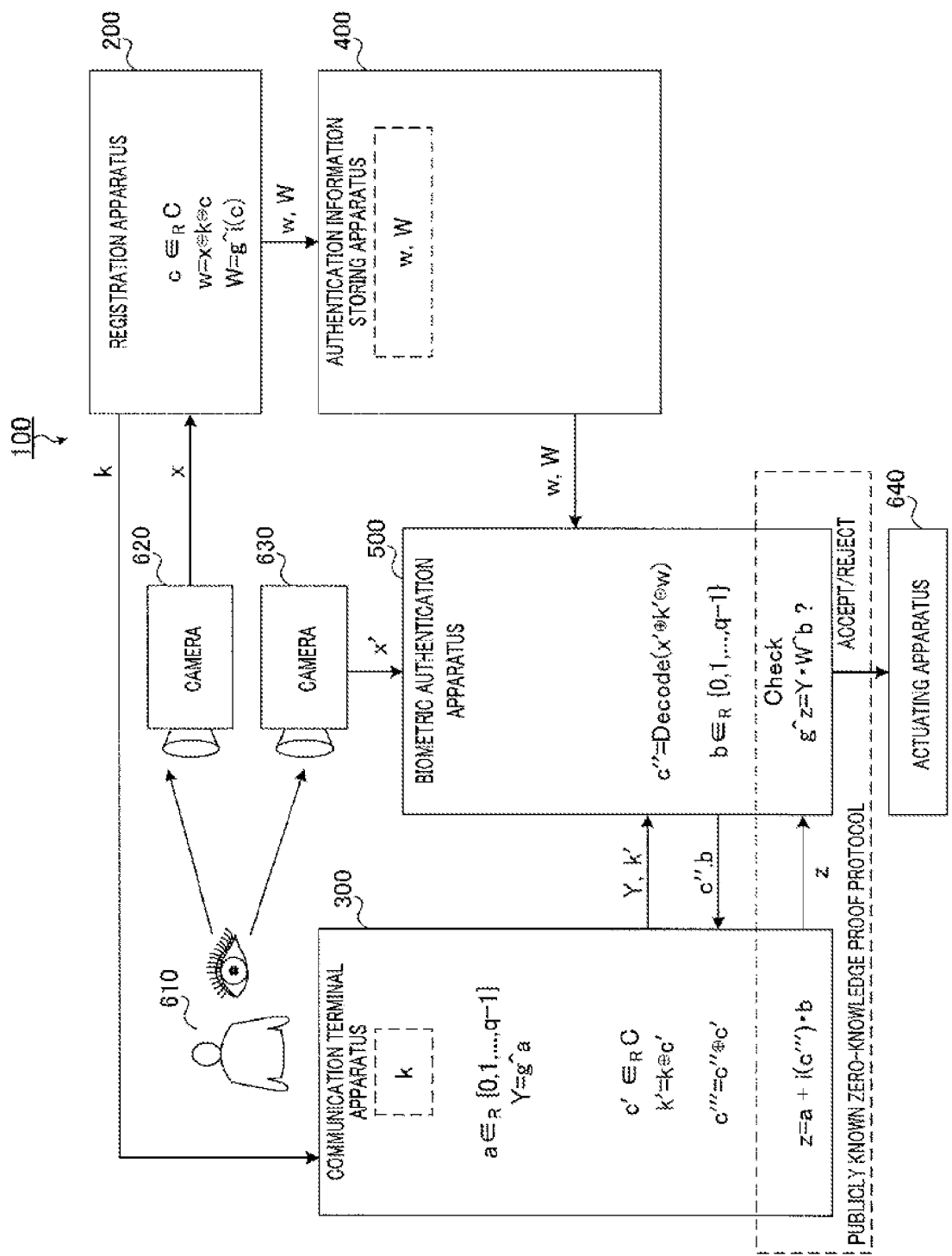
FIG. 2 illustrates an overview of biometric authentication in the biometric authentication system according to Embodiment 1.

FIG. 2 illustrates an overview of the biometric 16 authentication in biometric authentication system 100.

As shown in FIG. 2, user 610 first looks into camera 620 connected to registration apparatus 200 in the registration phase, and the iris of its pupil is then captured. Camera 620 is a biometric sensor for acquiring the image of the iris. When the captured image data is received from camera 620 as registered biometric information x, registration apparatus 200 randomly selects one code word from predetermined error correction code group C as authentication parameter c. This is represented, for example, by Equation 1 below. Registration apparatus 200 also issues key information k, and it is stored in communication terminal apparatus 300. In addition, registration apparatus 200 calculates registration conversion template w and public key information W using authentication parameter c. This is presented, for example, by Equations 2 and 3 below, where symbol g indicates a generator of a given multiplicative group, and i(c) in Equation 3 is an integer value that corresponds to authentication parameter c.

(Equation 1)

$$c \in_R C \qquad [1]$$

(Equation 2)

$$w = x \oplus k \oplus c \qquad [2]$$

(Equation 3)

$$W = g^{i(c)} \qquad [3]$$

When fingerprints or veins are employed as the biometric information to be registered, a fingerprint sensor (not shown) or a vein sensor (not shown) is used in place of camera 620, respectively. When voiceprints are employed as the biometric information to be registered, a voiceprint analyzing apparatus with a microphone (not shown) is used in place of camera 620. In these cases, the sensors and the analyzing apparatus extract feature values from the captured data to input them to registration apparatus 200 as registered biometric information x.

The calculated registration conversion templates w and public key information W are stored in authentication information storing apparatus 400, and they are retrieved by biometric authentication apparatus 500 when needed.

In the pre-authentication phase or the authentication phase, communication terminal apparatus 300 selects random value a on the terminal side (second random value) as represented in Equation 4 below. Communication terminal apparatus 300 then calculates first verification information Y as represented in Equation 5 below using random value a on the terminal side.

(Equation 4)

$$a \in_R \{0, 1, \ldots, q-1\} \qquad [4]$$

(Equation 5)

$$Y = g^a \qquad [5]$$

Communication terminal apparatus 300 also randomly selects one code word from predetermined error correction code group C as mask value c' as represented in Equation 6 below. Further, communication terminal apparatus 300 calculates key concealment information k' obtained by concealing key information k as represented in Equation 7 below using mask value c'.

(Equation 6)

$$c' \in_R C \quad [6]$$

(Equation 7)

$$k' = k \oplus c' \quad [7]$$

In the authentication phase, user 610 looks into camera 630 connected to biometric authentication apparatus 500, and the iris of its pupil is then captured: camera 630 is a biometric sensor for acquiring the image of the iris. Communication terminal apparatus 300 transmits key concealment information k' and first verification information Y to biometric authentication apparatus 500. When the captured image data is received from camera 630 as biometric information x' at the time of authentication and key concealment information k' is received, biometric authentication apparatus 500 obtains registration conversion template w and public key information W corresponding to user 610 from authentication information storing apparatus 400. Biometric authentication apparatus 500 then performs error correction processing on the exclusive OR of biometric information x' at the time of authentication, key concealment information k' and registration conversion templates w to obtain error corrected information c". This is represented, for example, by Equation 8 below, where "Decode" in Equation 8 is decoding algorithm associated with error correction code group C.

(Equation 8)

$$c'' = \mathrm{Decode}(x' \oplus k' \oplus w) \quad [8]$$

When fingerprints or veins are employed as the biometric information to be registered, a fingerprint sensor (not shown) or a vein sensor (not shown) is used in place of camera 630, respectively; when voiceprints are employed as the biometric information to be registered, a voiceprint analyzing apparatus with a microphone (not shown) is used in place of camera 630. In this case, the sensors and the analyzing apparatus extract feature values from the captured data to input them to biometric authentication apparatus 500 as biometric information x' at the time of authentication.

Biometric authentication apparatus 500 selects random value b on the apparatus side (first random value) as represented in Equation 9 below. Biometric authentication apparatus 500 then transmits random value b on the apparatus side and error corrected information c" to communication terminal apparatus 300.

(Equation 9)

$$b \in_R \{0, 1, \ldots, q-1\} \quad [9]$$

Upon receipt of random value b on the apparatus side and error corrected information c", communication terminal apparatus 300 calculates information c' to be verified as represented in Equation 10 below. Communication terminal apparatus 300 then calculates second verification information z as represented in Equation 11 below using information c''' to be verified and random value b on the apparatus side, and transmits second verification information z to biometric authentication apparatus 500.

(Equation 10)

$$c''' = c'' \oplus c' \quad [10]$$

(Equation 11)

$$z = a + i(c''') \cdot b \quad [11]$$

Biometric authentication apparatus 500 determines whether Equation 12 below is satisfied using received first verification information Y and second verification information z, thereby determining whether the biometric information at the time of authentication is similar to the registered biometric information. Equation 12 is the logical expression in an authentication protocol based on the zero-knowledge proof proposed in Non-Patent Literature 1.

(Equation 12)

$$g^z = Y \cdot W^b \quad [12]$$

If the information is determined to be coincident, biometric authentication apparatus 500 then outputs information indicating the acceptance (Accept) to actuating apparatus 640 (e.g., a functional section of an ATM) using the result of biometric authentication. If the information is determined to be not coincident, biometric authentication apparatus 500 may output information indicating the rejection (Reject).

The detection error is typically present between registered biometric information x and biometric information x' at the time of authentication. Accordingly, in the case where biometric information x' at the time of authentication can be expressed by Equation 13 below using detection error e, error corrected information c" is expressed by Equation 14 below:

(Equation 13)

$$x' = e \oplus x \quad [13]$$

(Equation 14)

$$c'' = \mathrm{Decode}(e \oplus x \oplus k' \oplus w) \quad [14]$$

Since detection error e is very small compared to the exclusive OR of registered biometric information x, key concealment information k', and registration conversion template w, detection error e can be eliminated by an error correction process. Accordingly, in the biometric authentication performed by a user himself, Equation 10 is deformed as shown in Equation 15 below:

$$\begin{aligned} c''' &= c'' \oplus c' \qquad \text{(Equation 15)} \\ &= [\mathrm{Decode}(e \oplus x \oplus k' \oplus w)] \oplus c' \\ &= [(x \oplus k' \oplus w)] \oplus c' \\ &= [x \oplus (k \oplus c') \oplus (x \oplus k \oplus c)] \oplus c' \\ &= c \end{aligned}$$

That is, information c''' to be verified coincides with authentication parameter c in the biometric authentication performed by a user himself. In this case, Equation 12 is deformed into Equation 16 below to be inevitably satisfied. Thus, biometric authentication system 100 can properly perform the biometric authentication on the basis of whether Equation 12 is satisfied.

$$g^z = Y \cdot W^b \quad \text{(Equation 16)}$$
$$= g^a \cdot g^{i(c)b}$$
$$= g^{a+i(c)b}$$
$$= g^z$$

According to such biometric authentication, even in case of leak of both of registration conversion template w and key information k, original registered biometric information x cannot be restored without obtaining authentication parameter c. Furthermore, information c''' to be verified is concealed; hence, the risk of leak of authentication parameter c is very low. Thus, biometric authentication system 100 can prevent the spoofing attacks even in case of leak of registration conversion template w and key information k.

Each configuration of the apparatuses will now be described. In each block diagram of the following apparatuses, symbols indicating the flow of information and other apparatuses are described for convenience.

The configuration of registration apparatus 200 will now be described.

Figure 3:
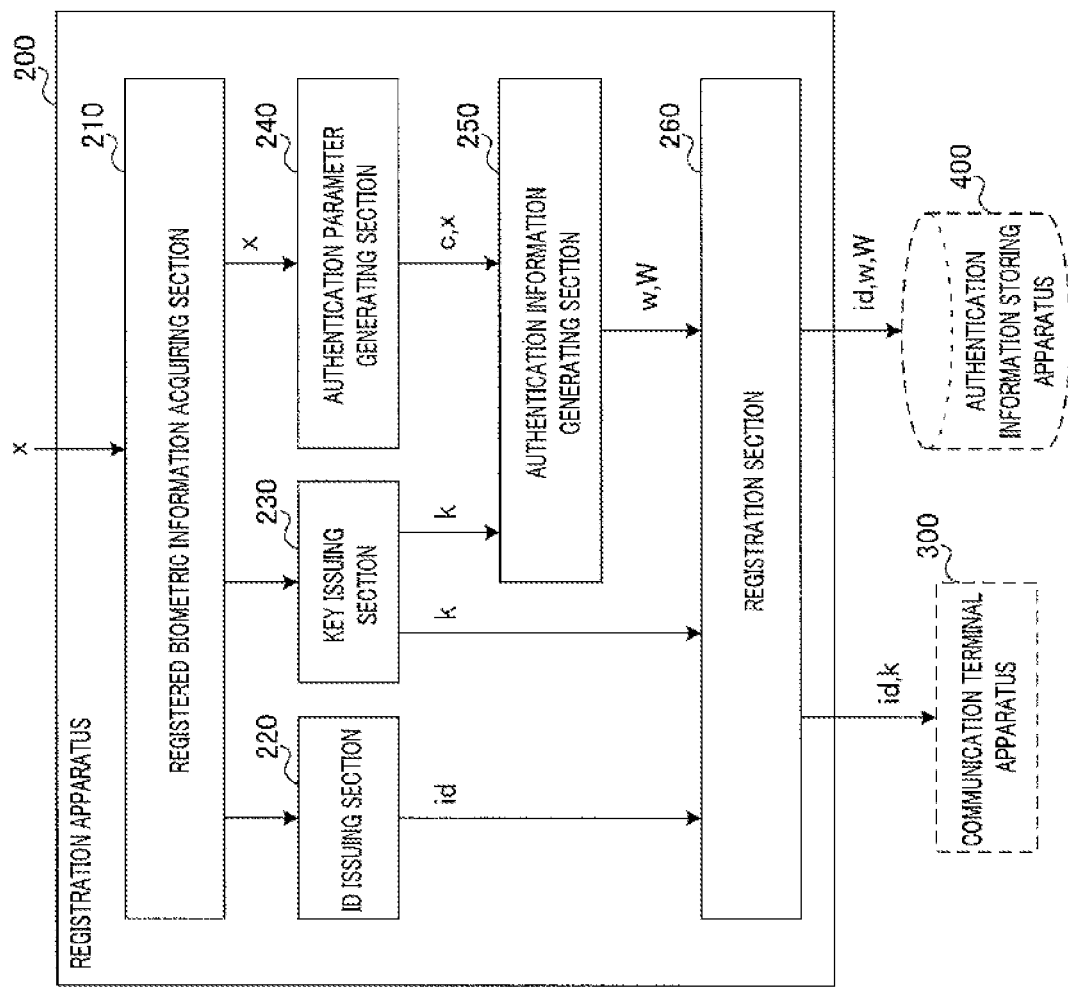
FIG. 3 is a block diagram illustrating the configuration of a registration apparatus in Embodiment 1.

FIG. 3 is a block diagram illustrating the configuration of registration apparatus 200.

In FIG. 3, registration apparatus 200 includes registered biometric information acquiring section 210, ID issuing section 220, key issuing section 230, authentication parameter generating section 240, authentication information generating section 250, and registration section 260.

Registered biometric information acquiring section 210 acquires registered biometric information x from a user via a biometric sensor (e.g., camera 620 in FIG. 2) at the time of the registration to output it to authentication parameter generating section 240. Each time registered biometric information acquiring section 210 outputs registered biometric information x to authentication parameter generating section 240, it also outputs instructions for information issuance to ID issuing section 220 and key issuing section 230.

Each time the instruction for the information issuance is received, ID issuing section 220 issues ID information id that is unique to each user, and outputs it to registration section 260.

Each time the instruction for the information issuance is received, key issuing section 230 generates and issues key information k to output it to registration section 260 and authentication information generating section 250. Key information k is, for example, a random number having a predetermined length.

Each time registered biometric information x is received, authentication parameter generating section 240 generates authentication parameter c (see Equation 1), and outputs authentication parameter c and registered biometric information x to authentication information generating section 250.

Upon receipt of registered biometric information x, and key information k and authentication parameter c corresponding thereto, authentication information generating section 250 generates registration conversion template w and public key information W (see Equations 2 and 3). Authentication information generating section 250 then outputs registration conversion template w and public key information W to registration section 260.

Registration section 260 is connected to communication terminal apparatus 300 of the user only in a registration mode, whereas it is always connected to authentication information storing apparatus 400. Upon receipt of registration conversion template w, and ID information id, key information k and public key information W corresponding thereto, registration section 260 first transmits ID information id and key information k to communication terminal apparatus 300. Registration section 260 then sends a set of ID information id, registration conversion template w, and public key information W to authentication information storing apparatus 400.

Such registration apparatus 200 can acquire registered biometric information x, register key information k in communication terminal apparatus 300, and can register registration conversion template w and public key information W in authentication information storing apparatus 400.

The configuration of communication terminal apparatus 300 will now be described.

Figure 4:
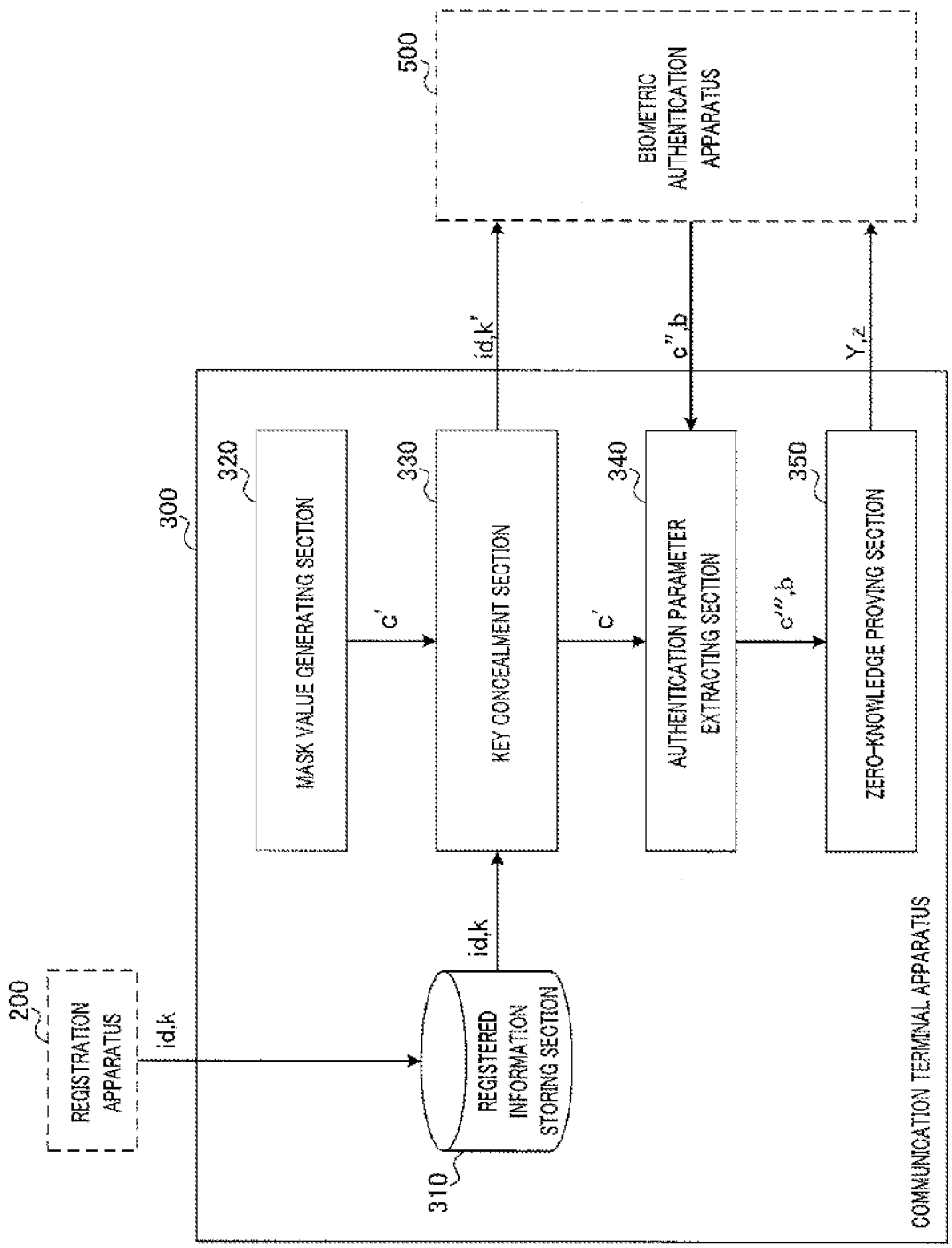
FIG. 4 is a block diagram illustrating the configuration of a communication terminal apparatus according to Embodiment 1.

FIG. 4 is a block diagram illustrating the configuration of communication terminal apparatus 300.

In FIG. 4, communication terminal apparatus 300 includes registered information storing section 310, mask value generating section 320, key concealment section 330, authentication parameter extracting section 340, and zero-knowledge proving section 350.

Registered information storing section 310 is connected to registration apparatus 200 only in a registration mode, and stores ID information id and key information k upon receipt of them from registration apparatus 200.

Mask value generating section 320 generates mask value c' (see Equation 6) to output it to key concealment section 330. Mask value c' is generated and output, for example, when triggered by the instruction from biometric authentication apparatus 500 at the time of the authentication.

Key concealment section 330 is connected to biometric authentication apparatus 500 only in an authentication mode. Each time mask value c' is received, key concealment section 330 retrieves ID information id and key information k from registered information storing section 310 to generate key concealment information k' (see Equation 7). Key concealment section 330 then transmits ID information id and key concealment information k' to biometric authentication apparatus 500, and outputs mask value c' to authentication parameter extracting section 340.

Authentication parameter extracting section 340 is connected to biometric authentication apparatus 500 only in an authentication mode. Upon receipt of error corrected information c'' and random value b on the apparatus side from biometric authentication apparatus 500, authentication parameter extracting section 340 generates information c''' to be verified using input mask value c' (see Equation 10). Authentication parameter extracting section 340 then outputs random value b on the apparatus side and information c''' to be verified to zero-knowledge proving section 350.

Zero-knowledge proving section 350 is connected to biometric authentication apparatus 500 only in an authentication mode. Zero-knowledge proving section 350 selects random value a on the terminal side (see Equation 4) to calculate first verification information Y (see Equation 5), and transmits calculated first verification information Y to biometric authentication apparatus 500. Upon receipt of random value b on the apparatus side and information c''' to be verified, zero-knowledge proving section 350 also calculates second verification information z (see Equation 11), and transmits calculated second verification information z to biometric authentication apparatus 500.

Such communication terminal apparatus 300 can store registered ID information id and key information k. Communication terminal apparatus 300 can transmit key concealment information k' concealed using mask value c', ID information id, and first verification information Y to biometric authentication apparatus 500 at the time of the biometric authentication. Furthermore, communication terminal apparatus 300 can receive error corrected information c" and random value b on the apparatus side, and can generate and return second verification information z on the basis thereof.

The configuration of authentication information storing apparatus 400 will now be described.

Figure 5:
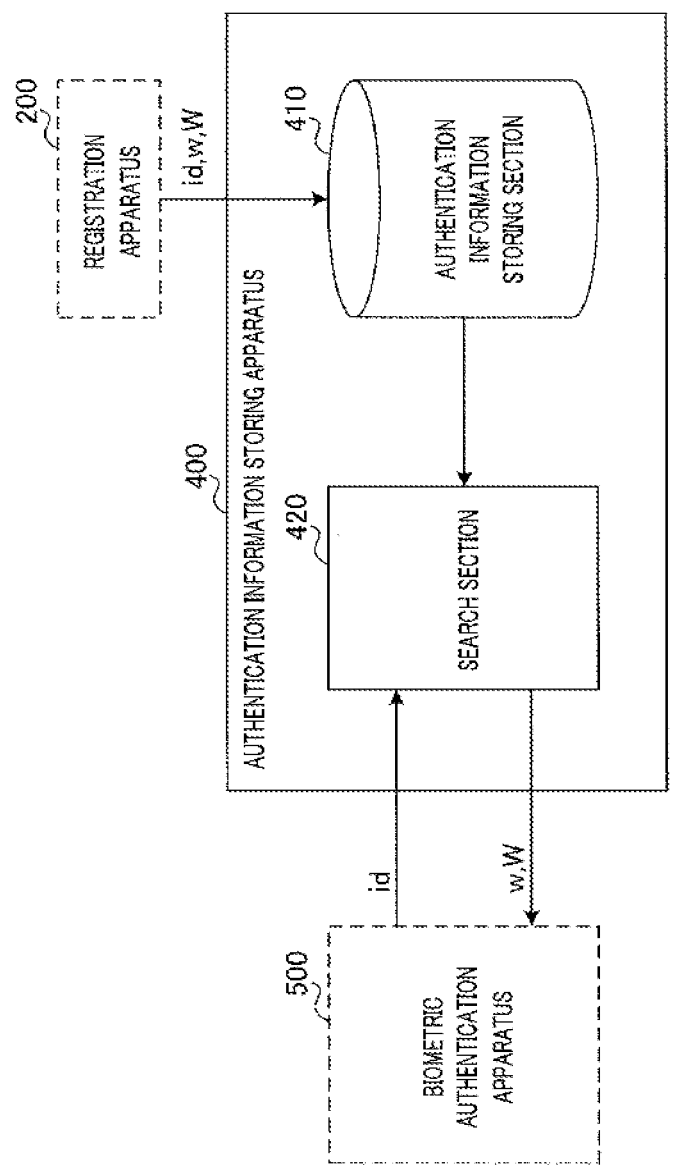
FIG. 5 is a block diagram illustrating the configuration of authentication information storing apparatus in Embodiment 1.

FIG. 5 is a block diagram illustrating the configuration of authentication information storing apparatus 400.

In FIG. 5, authentication information storing apparatus 400 includes authentication information storing section 410 and search section 420.

Authentication information storing section 410 is always connected to registration apparatus 200. Upon reception of a set of ID information id, registration conversion template w, and public key information W from registration apparatus 200, authentication information storing section 410 stores it.

Search section 420 is always connected to biometric authentication apparatus 500. Each time biometric authentication apparatus 500 specifies ID information id, search section 420 searches for registration conversion template w and public key information W that are teamed with specified ID information id to return them to biometric authentication apparatus 500.

Such authentication information storing apparatus 400, which can be always ready to be read from biometric authentication apparatus 500, can store a set of ID information id, registration conversion template w, and public key information W that are registered.

The configuration of biometric authentication apparatus 500 will now be described.

Figure 6:
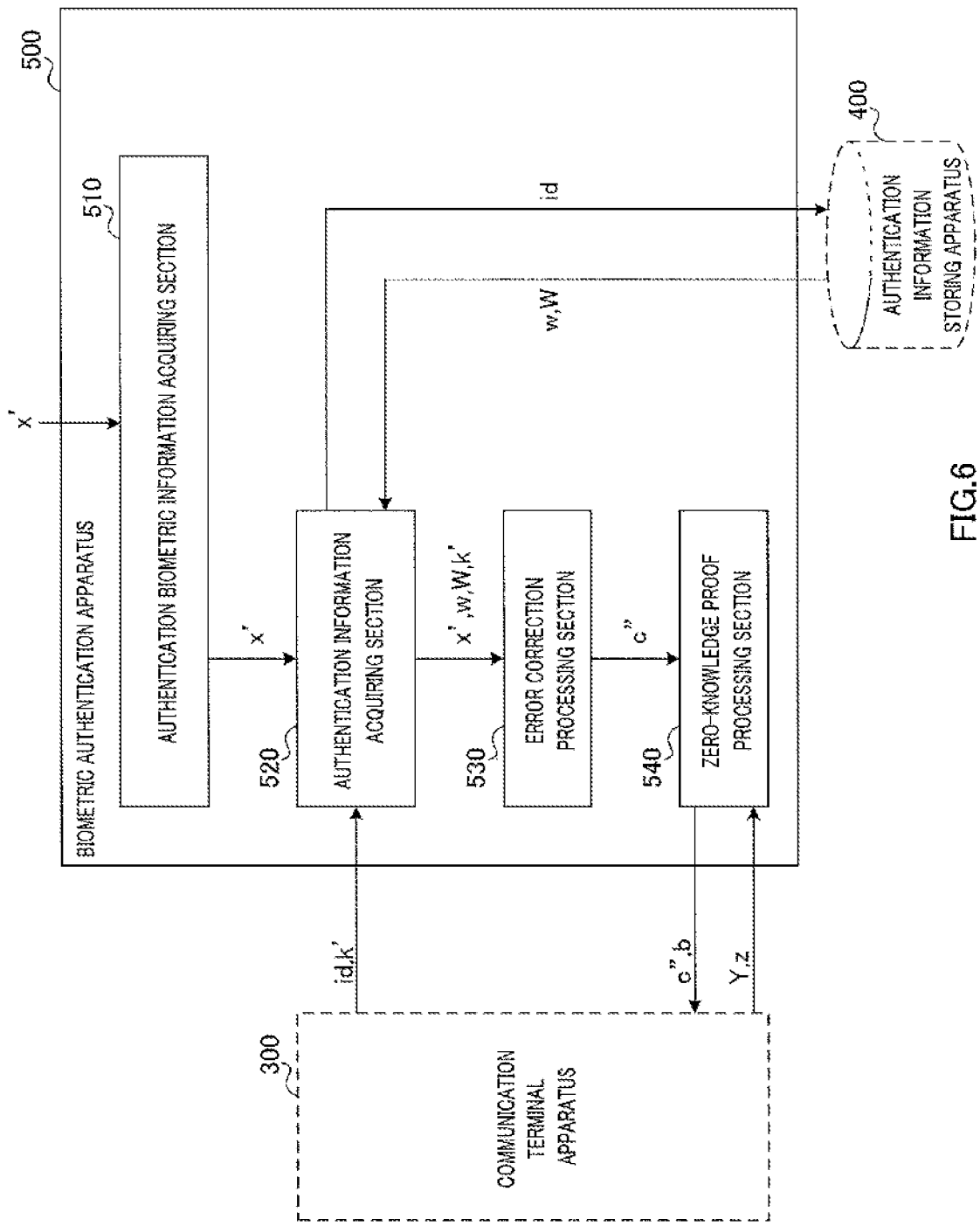
FIG. 6 is a block diagram illustrating the configuration of a biometric authentication apparatus according to Embodiment 1.

FIG. 6 is a block diagram illustrating the configuration of biometric authentication apparatus 500.

In FIG. 6, biometric authentication apparatus 500 includes authentication biometric information acquiring section 510, authentication information acquiring section 520, error correction processing section 530, and zero-knowledge proof processing section 540.

At the time of the authentication, authentication biometric information acquiring section 510 acquires biometric information x' at the time of authentication via a biometric sensor (e.g., camera 630 in FIG. 2) from an authenticatee, and outputs it to authentication information acquiring section 520.

Authentication information acquiring section 520 is always connected to authentication information storing apparatus 400, whereas it is connected to the communication terminal apparatus of an authenticatee only during authentication. The communication terminal apparatus, which includes one that is not communication terminal apparatus 300 according to the present invention, is assumed to be connected to communication terminal apparatus 300 for convenience of the description. Authentication information acquiring section 520 receives ID information id and key concealment information k' from the communication terminal apparatus at the time of the authentication, and makes a request to authentication information storing apparatus 400 for registration conversion template w and public key information W upon receipt of biometric information x' at the time of authentication. The request is performed by sending and specifying received ID information id to authentication information storing apparatus 400. Upon receipt of registration conversion template w and public key information W, authentication information acquiring section 520 outputs biometric information x' at the time of authentication, registration conversion template w, public key information W, and key concealment information k' to error correction processing section 530.

When biometric information x' at the time of authentication, registration conversion template w, public key information W, and key concealment information k' are received, error correction processing section 530 generates error corrected information c" (see Equation 8) to output it to zero-knowledge proof processing section 540.

Zero-knowledge proof processing section 540 is connected to communication terminal apparatus 300 only during authentication. When error corrected information c" is received, zero-knowledge proof processing section 540 selects random value b on the apparatus side (see Equation 9), and transmits error corrected information c" and random value b on the apparatus side to communication terminal apparatus 300. Upon receipt of first verification information Y and second verification information z from communication terminal apparatus 300, zero-knowledge proof processing section 540 then determines the success or failure of the authentication on the basis of the zero-knowledge proof (see Equation 12).

Such biometric authentication apparatus 500 can acquire biometric information x' at the time of authentication from an authenticatee. Biometric authentication apparatus 500 can acquire key concealment information k', registration conversion template w, and public key information W corresponding thereto, and can generate error corrected information c" to transmit it to communication terminal apparatus 300. Biometric authentication apparatus 500 also can perform the biometric authentication on the basis of first verification information Y and second verification information z received from communication terminal apparatus 300 using random value b on the apparatus side transmitted in the same manner.

Registration apparatus 200, communication terminal apparatus 300, authentication information storing apparatus 400, and biometric authentication apparatus 500 described above have their storage media (not shown) such as central processing units (CPUs) and random access memories (RAMs). In these cases, each of the above-described functional sections is implemented by its CPU executing a control program.

The operation of each apparatus will now be described.

The operation of registration apparatus 200 is first described.

Figure 7:
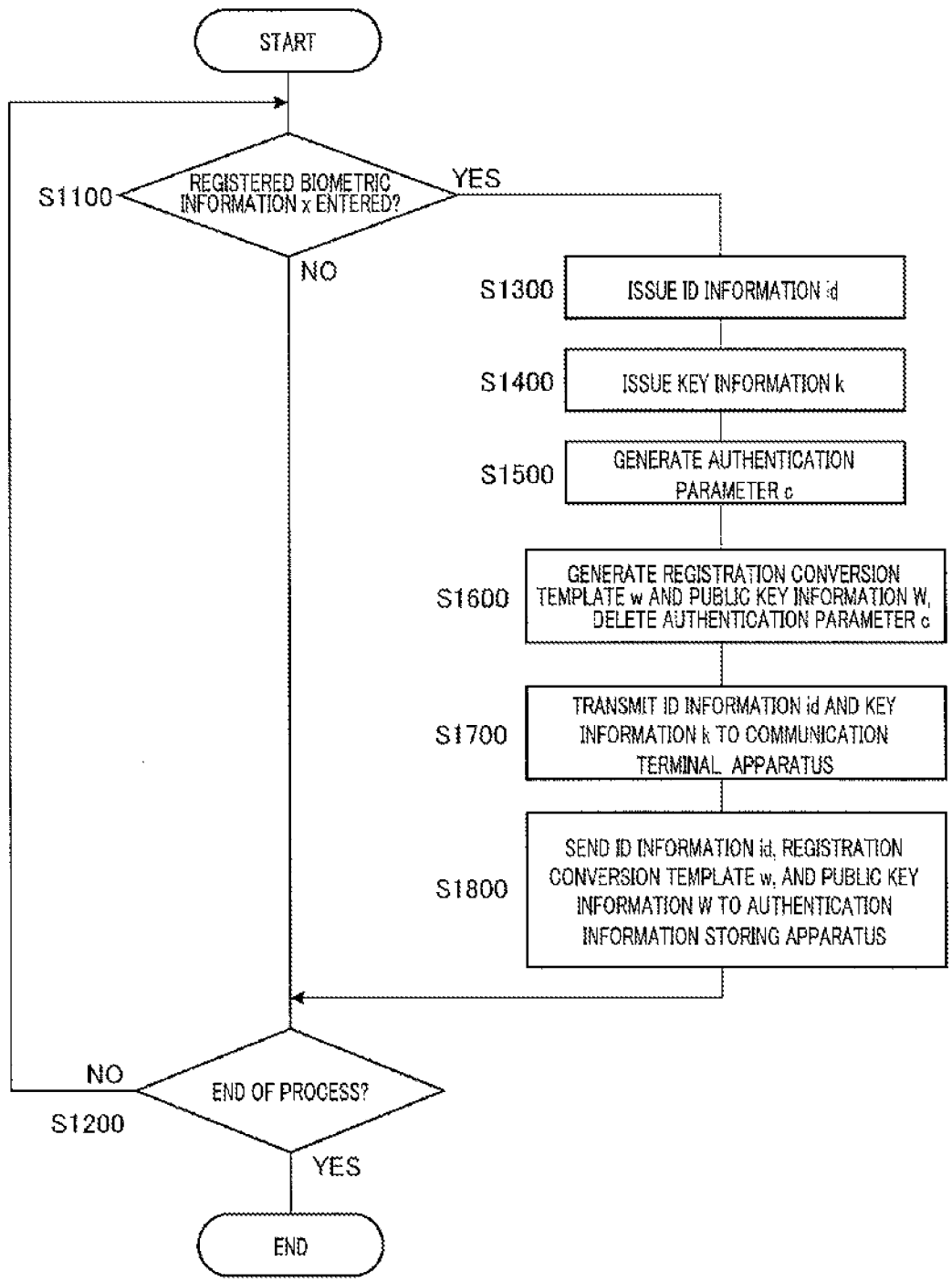
FIG. 7 is a flow chart representing the operation of the registration apparatus in Embodiment 1.

FIG. 7 is a flow chart representing the operation of registration apparatus 200.

In step S1100, registered biometric information acquiring section 210 determines whether new registered biometric information x is entered, i.e., whether the registration is started. If registered biometric information x is not entered (S1100: NO), registered biometric information acquiring section 210 carries out step S1200. If registered biometric information x is entered (S1100: YES), registered biometric information acquiring section 210 carries out step S1300.

In step S1300, ID issuing section 220 issues ID information id.

In step S1400, key issuing section 230 issues key information k.

In step S1500, authentication parameter generating section 240 generates authentication parameter c (see Equation 1).

In step S1600, authentication information generating section 250 generates registration conversion template w and public key information W from key information k, authentication parameter c, and the registered biometric information (see Equations (2) and (3)). After the generation of registration conversion template w and public key information W, authentication information generating section 250 deletes original authentication parameter c from all storage media of registration apparatus 200.

In step S1700, registration section 260 transmits ID information id and key information k to communication terminal apparatus 300.

In step S1800, registration section 260 sends a set of ID information id, registration conversion template w, and public key information W to authentication information storing apparatus 400, and carries out step S1200.

In step S1200, registered biometric information acquiring section 210 determines the instruction of the end of the process, for example, by a user operation. If the end of the process is not instructed (S1200: NO), registered biometric information acquiring section 210 carries out step S1100 again. If the end of the process is instructed (S1200: YES), registered biometric information acquiring section 210 ends the series of processes.

Thus, each time the registration is performed, registration apparatus 200 can issue key information k to register it in communication terminal apparatus 300, and can generate registration conversion template w and public key information W to register them in authentication information storing apparatus 400.

The operation of communication terminal apparatus 300 will now be described.

Figure 8:
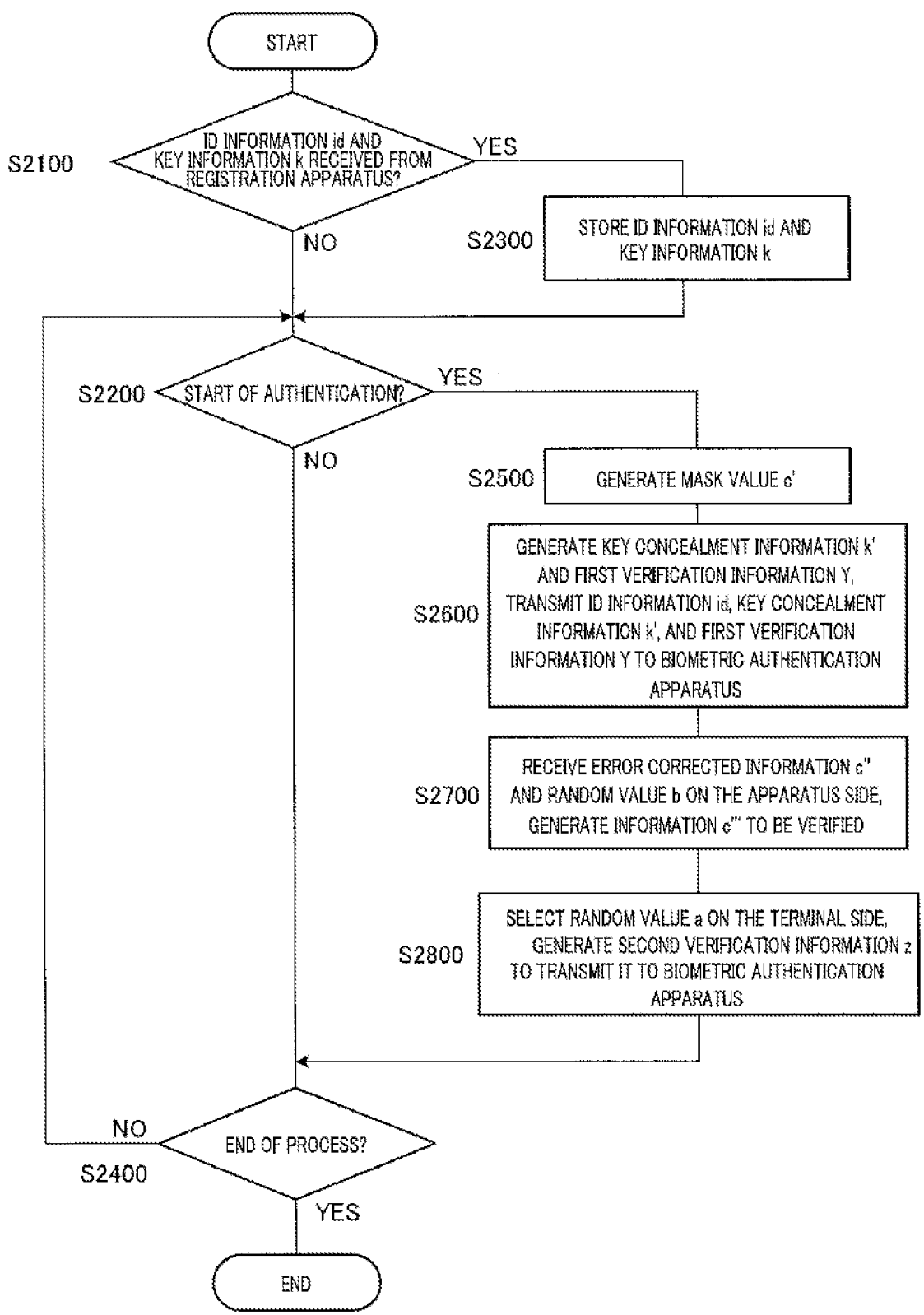
FIG. 8 is a flow chart representing the operation of the communication terminal apparatus according to Embodiment 1.

FIG. 8 is a flow chart representing the operation of communication terminal apparatus 300.

In step S2100, registered information storing section 310 determines the reception of ID information id and key information k from registration apparatus 200. Upon no receipt of ID information id and key information k (S2100: NO), registered information storing section 310 carries out step S2200. Upon receipt of ID information id and key information k (S2100: YES), registered information storing section 310 carries out step S2300.

In step S2300, registered information storing section 310 stores and holds received ID information id and key information k, and carries out step S2200.

In step S2200, mask value generating section 320 determines whether the authentication is started. As described above, this is achieved by determining, for example, whether a predetermined user operation is performed. If no authentication is started (S2200: NO), mask value generating section 320 carries out step S2400. If the authentication has been started (S2200: YES), mask value generating section 320 carries out step S2500.

In step S2500, mask value generating section 320 generates mask value c' (see Equation 6).

In step S2600, key concealment section 330 generates key concealment information k' from mask value c' and the key information (see Equation 7), and transmits ID information id and key concealment information k' to biometric authentication apparatus 500. Zero-knowledge proving section 350 selects random value a on the terminal side (see Equation 4), and generates first verification information Y from random value a on the terminal side (see Equation 5). For example, each time ID information id and key concealment information k' are transmitted, zero-knowledge proving section 350 selects random value a on the terminal side, and transmits first verification information Y to biometric authentication apparatus 500.

In step S2700, authentication parameter extracting section 340 receives error corrected information c" and random value b on the apparatus side from biometric authentication apparatus 500. Authentication parameter extracting section 340 then generates information c''' to be verified from mask value c' and error corrected information c" (see Equation 10).

In step S2800, zero-knowledge proving section 350 generates second verification information z from random value a on the terminal side, random value b on the apparatus side, and information c''' to be verified (see Equation 11). Zero-knowledge proving section 350 then transmits second verification information z to biometric authentication apparatus 500, and carries out step S2400.

In step S2400, mask value generating section 320 determines the instruction of the end of the process, for example, by a user operation. If the end of the process is not instructed (S2400: NO), mask value generating section 320 carries out step S2200 again. If the end of the process has been instructed (S2400: YES), mask value generating section 320 ends the series of processes.

Thus, for each authentication, communication terminal apparatus 300 can transmit different key concealment information k' and first verification information Y each time to biometric authentication apparatus 500. Communication terminal apparatus 300 also can generate information c''' to be verified using mask value c' used to generate key concealment information k' and error corrected information c" transmitted from biometric authentication apparatus 500. Communication terminal apparatus 300 then can conceal information c''' to be verified using random value b on the apparatus side transmitted from biometric authentication apparatus 500 and random value a on the terminal side only known by communication terminal apparatus 300, and can return second verification information z.

The operation of authentication information storing apparatus 400 will now be described.

Each time a set of ID information id, registration conversion template w, and public key information W is received from registration apparatus 200, authentication information storing section 410 stores and holds it. At the same time, each time ID information id is specified by biometric authentication apparatus 500, search section 420 searches for registration conversion template w and public key information W that are paired with specified ID information id, and returns them to biometric authentication apparatus 500. Thus authentication information storing apparatus 400 can hold a registered set of ID information id, registration conversion template w, and public key information W, and can return registration conversion template w and public key information W in response to a request from biometric authentication apparatus 500.

The operation of biometric authentication apparatus 500 will now be described.

Figure 9:
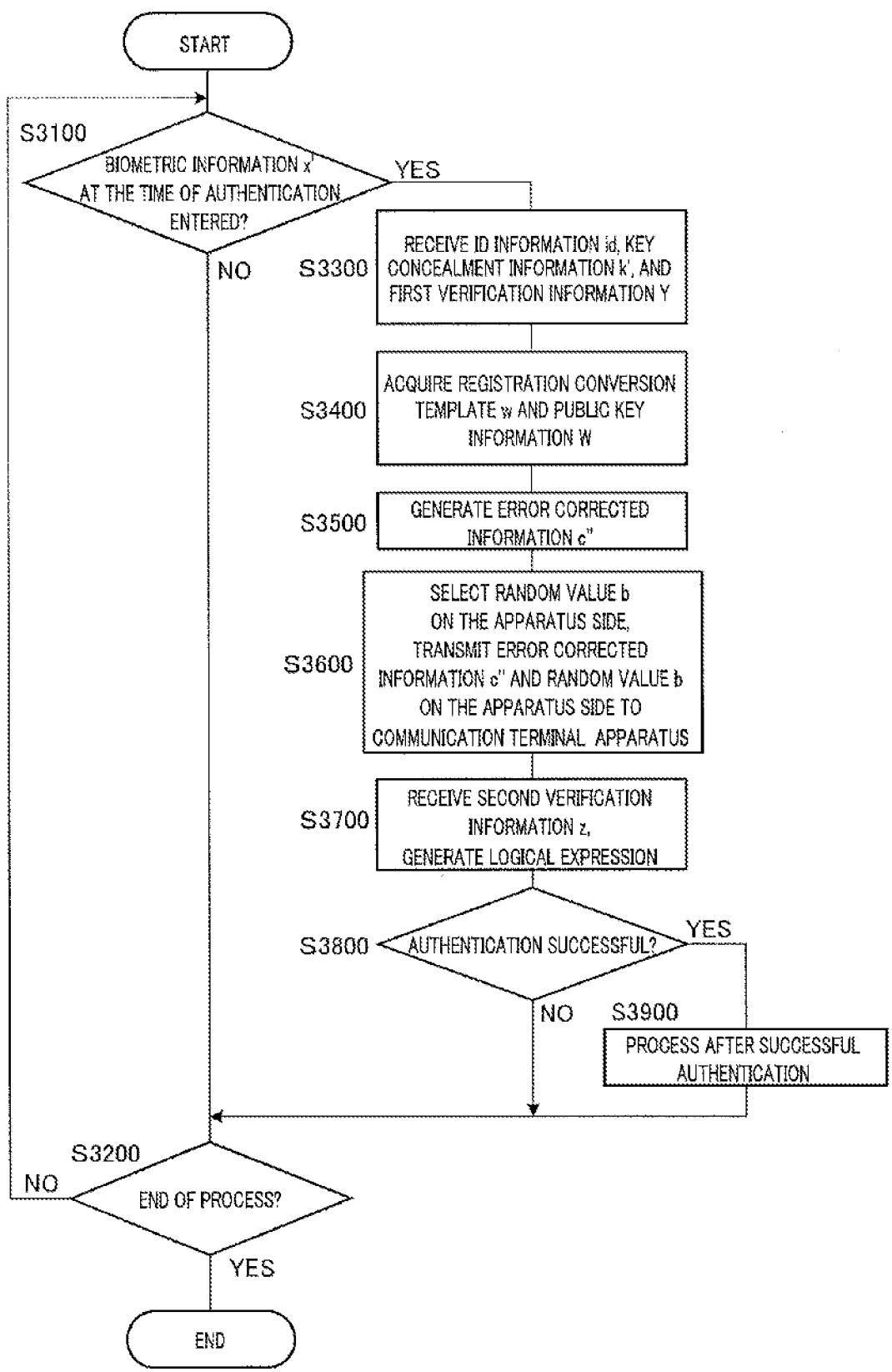
FIG. 9 is a flow chart representing the operation of the biometric authentication apparatus according to Embodiment 1.

FIG. 9 is a flow chart representing the operation of biometric authentication apparatus 500.

In step S3100, authentication biometric information acquiring section 510 determines whether new authentication biometric information x' is entered, i.e., whether the authentication is started. If biometric information x' at the time of authentication is not entered (S3100: NO), authentication biometric information acquiring section 510 carries out step S3200. If biometric information x' at the time of authentication is entered (S3100: YES), authentication biometric information acquiring section 510 carries out step S3300.

In step S3300, authentication information acquiring section 520 receives ID information id, key concealment information k' and first verification information Y from communication terminal apparatus 300 owned by an authenticatee, and transfers ID information id to authentication information storing apparatus 400.

In step S3400, authentication information acquiring section 520 acquires registration conversion template w and public key information W corresponding to ID information id from authentication information storing apparatus 400.

In step S3500, error correction processing section 530 generates error corrected information c" from biometric information x' at the time of authentication, key concealment information k', and registration conversion template w (see Equation 8).

In step S3600, zero-knowledge proof processing section 540 selects random value b on the apparatus side (see Equation 9), and transmits error corrected information c" and random value b on the apparatus side to communication terminal apparatus 300.

In step S3700, zero-knowledge proof processing section 540 receives second verification information z from communication terminal apparatus 300, and generates the logical expression in a zero-knowledge proof protocol therefrom (see Equation 12).

In step S3800, zero-knowledge proof processing section 540 determines successful authentication based on the satisfaction of the logical expression. If the authentication is successful (S3800: YES), zero-knowledge proof processing section 540 carries out step S3900. If the authentication is unsuccessful (S3800: NO), zero-knowledge proof processing section 540 carries out step S3200.

In step S3900, zero-knowledge proof processing section 540 performs a predetermined process in the case of the successful authentication, such as outputting information indicating the acceptance to actuating apparatus 640 shown in FIG. 2, and carries out step S3200.

In step S3200, authentication biometric information acquiring section 510 determines the instruction of the end of the process, for example, by a user operation. If the end of the process is not instructed (S3200: NO), authentication biometric information acquiring section 510 carries out step S3100 again. If the end of the process is instructed (S3200: YES), authentication biometric information acquiring section 510 ends the series of processes.

Thus, for each authentication attempt, biometric authentication apparatus 500 can acquire the biometric information at the time of authentication, key concealment information k' from communication terminal apparatus 300, and registration conversion template w and public key information W corresponding thereto. Biometric authentication apparatus 500 also can transmit error corrected information c" and random value b on the apparatus side to communication terminal apparatus 300. Furthermore, biometric authentication apparatus 500 determines the success or failure of the authentication on the basis of first verification information Y previously received and second verification information z obtained by concealing returned information c'" to be verified.

As described above, biometric authentication system 100 according to the present embodiment restores authentication parameter c used at the time of the registration as information c'" to be verified in communication terminal apparatus 300, and performs authentication based on whether correct authentication parameter c is restored. Biometric authentication system 100 is also configured to restore authentication parameter c used at the time of the registration as information c'" to be verified in communication terminal apparatus 300 only when both of biometric information at the time of authentication of a registered user and communication terminal apparatus 300 having received the issue at the time of the registration are provided. That is, malicious third parties cannot readily obtain authentication parameters c in biometric authentication system 100. Thus, biometric authentication system 100 can hamper restoration of registered biometric information x in case of leak of both of registration conversion template w and key information k, thereby preventing spoofing attacks.

Furthermore, since biometric authentication system 100 restores authentication parameter c only in communication terminal apparatus 300 at the time of the authentication of a legitimate user, the authentication can be successful only if both of a legitimate user and its communication terminal apparatus 300 are provided.

Biometric authentication system 100 can reduce the risk of leak of the feature value of biometric information and invalid authentication due to spoofing, so that authentication information storing apparatus 400 managing authentication information can be operated in an open environment. For example, authentication information storing apparatus 400 may function as a server apparatus provided by a third party. The server may be a cloud-based server which has no physical and geographical restrictions, and may be operated at a low cost. Biometric authentication apparatus 500 does not need a robust protection, can be installed in a public environment exposed to many people, and can be implemented in consumer equipment such as electrical appliances.

Embodiment 2

An exemplary system according to Embodiment 2 of the present invention transmits random value a on the terminal side onto a biometric authentication apparatus, and calculates first verification information Y in the biometric authentication apparatus.

An overview of biometric authentication in a biometric authentication system according to the present embodiment will now be described.

Figure 10:
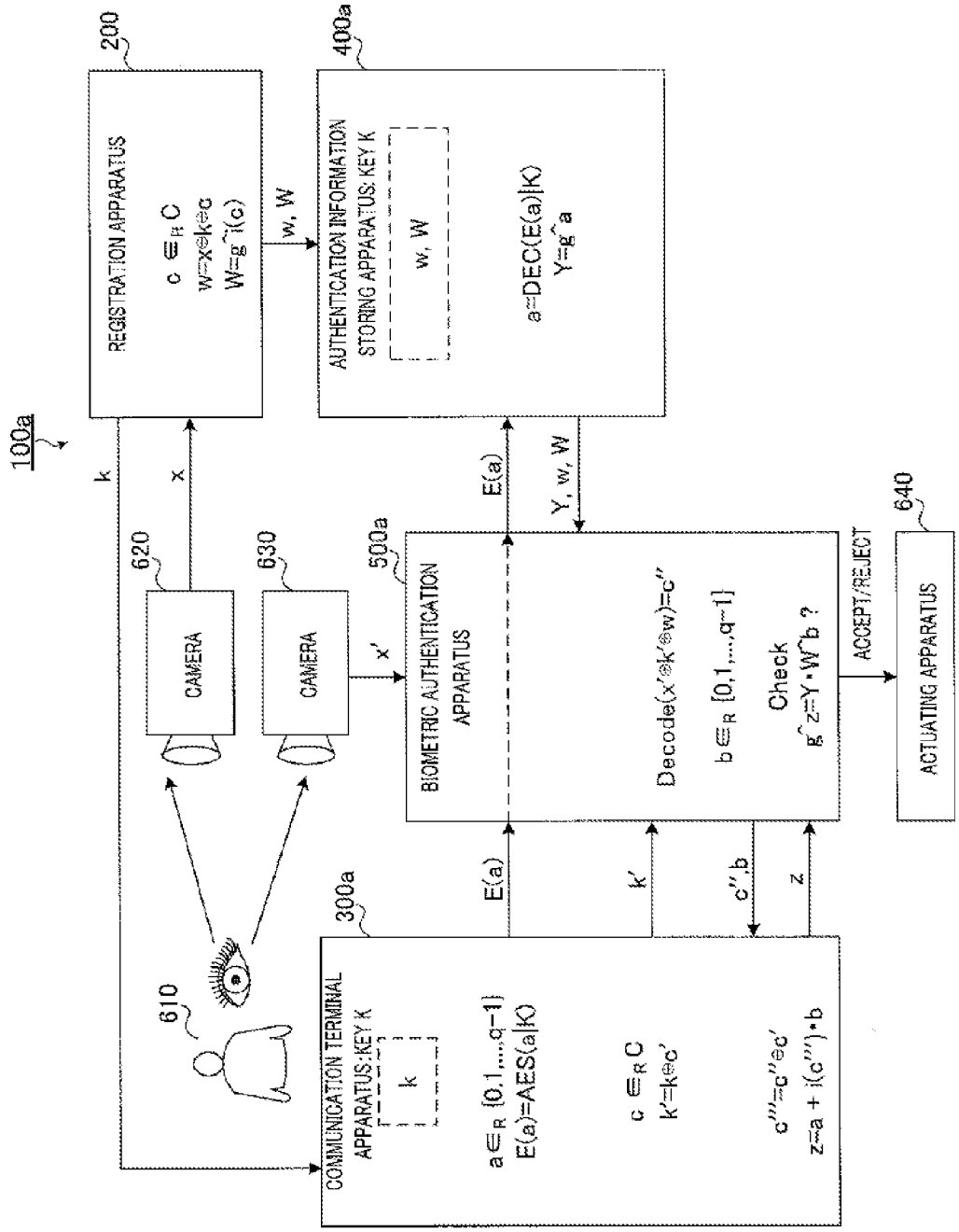
FIG. 10 illustrates an overview of biometric authentication in a biometric authentication system according to Embodiment 2 of the present invention.

FIG. 10 illustrates the overview of the biometric authentication in the biometric authentication system according to the present embodiment, and it corresponds to FIG. 2 of Embodiment 1.

As shown in FIG. 10, biometric authentication system 100a according to the present embodiment includes communication terminal apparatus 300a, authentication information storing apparatus 400a, and biometric authentication apparatus 500a different from those of Embodiment 1, where the arrangement of apparatuses are the same as in Embodiment 1.

Communication terminal apparatus 300a and authentication information storing apparatus 400a preliminarily hold encryption key K. Communication terminal apparatus 300a calculates random value encrypted information E(a) that is the encrypted version of random value a on the terminal side using encryption key K as represented in Equation 17 below. Communication terminal apparatus 300a then transmits calculated random value encrypted information E(a) via biometric authentication apparatus 500a to authentication information storing apparatus 400a, where AES(a|K) represents random value a encrypted by encryption algorithm AES and encryption key K.

(Equation 17)

$$E(a)=AES(a|K) \qquad [17]$$

Authentication information storing apparatus 400a decodes original random value a on the terminal side from random value encrypted information E(a) using encryption key K as represented in Equation 18 below. Authentication information storing apparatus 400a then calculates first verification information Y from decoded random value a on the terminal side (see Equation 5), and transmits it to biometric authentication apparatus 500a, where DEC(E(a)|K) represents the decoded result of random value encrypted information E(a) using decoding algorithm DEC and encryption key K.

(Equation 18)

$$a = DEC(E(a)|K) \quad [18]$$

Subsequent processes are the same as in Embodiment 1. Accordingly, biometric authentication system 100a according to the present embodiment can reduce the risk of spoofing attacks even in case of leak of registration conversion template w and key information k. Calculation of first verification information Y in the biometric authentication apparatus (in authentication information storing apparatus 400a in the present embodiment) allows the present invention to be applied even to slow and low-resource communication terminal apparatus 300a.

The configuration of the components different from Embodiment 1 will now be described.

The configuration of communication terminal apparatus 300a is first described.

Figure 11:
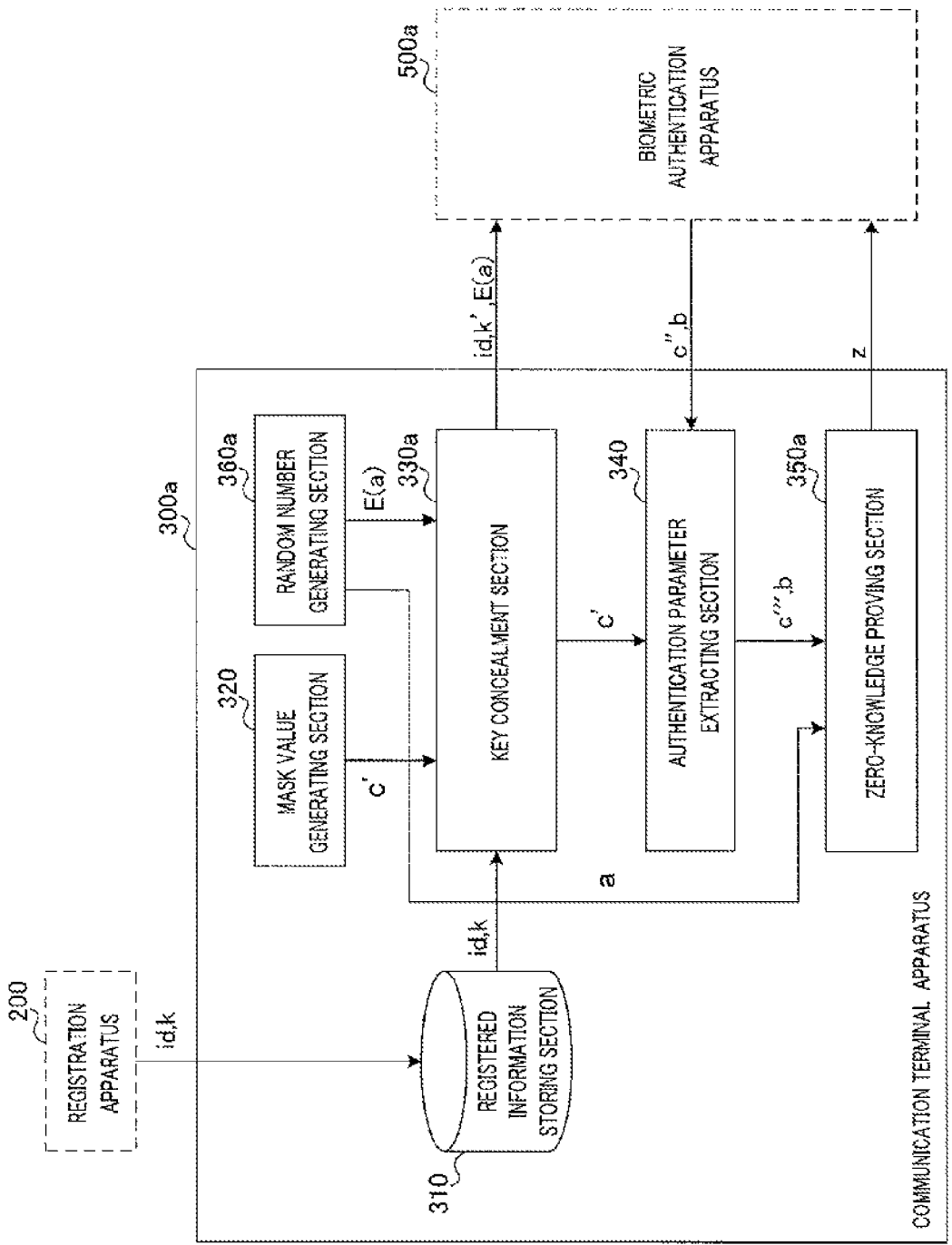
FIG. 11 is a block diagram illustrating the configuration of a communication terminal apparatus according to Embodiment 2.

FIG. 11 is a block diagram illustrating the configuration of communication terminal apparatus 300a, and it corresponds to FIG. 4 of Embodiment 1. The same components as shown in FIG. 4 are denoted by the same reference numerals as in FIG. 4, without redundant description.

As shown in FIG. 11, communication terminal apparatus 300a includes new random number generating section 360a, and key concealment section 330a and zero-knowledge proving section 350a that are different from the key concealment section and the zero-knowledge proving section of Embodiment 1.

Random number generating section 360a selects random value a on the terminal side (see Equation 4), and calculates random value encrypted information E(a) using encryption key K (see Equation 17). Random number generating section 360a then outputs random value encrypted information E(a) and random value a on the terminal side to key concealment section 330a and zero-knowledge proving section 350a, respectively.

At the time of the authentication, key concealment section 330a transmits random value encrypted information E(a) as well as ID information id and key concealment information k' to biometric authentication apparatus 500a.

Zero-knowledge proving section 350a calculates only second verification information z using random value a on the terminal side received from random number generating section 360a with no generation of random value a on the terminal side and first verification information Y, and transmits second verification information z to biometric authentication apparatus 500a.

The configuration of authentication information storing apparatus 400a will now be described.

Figure 12:
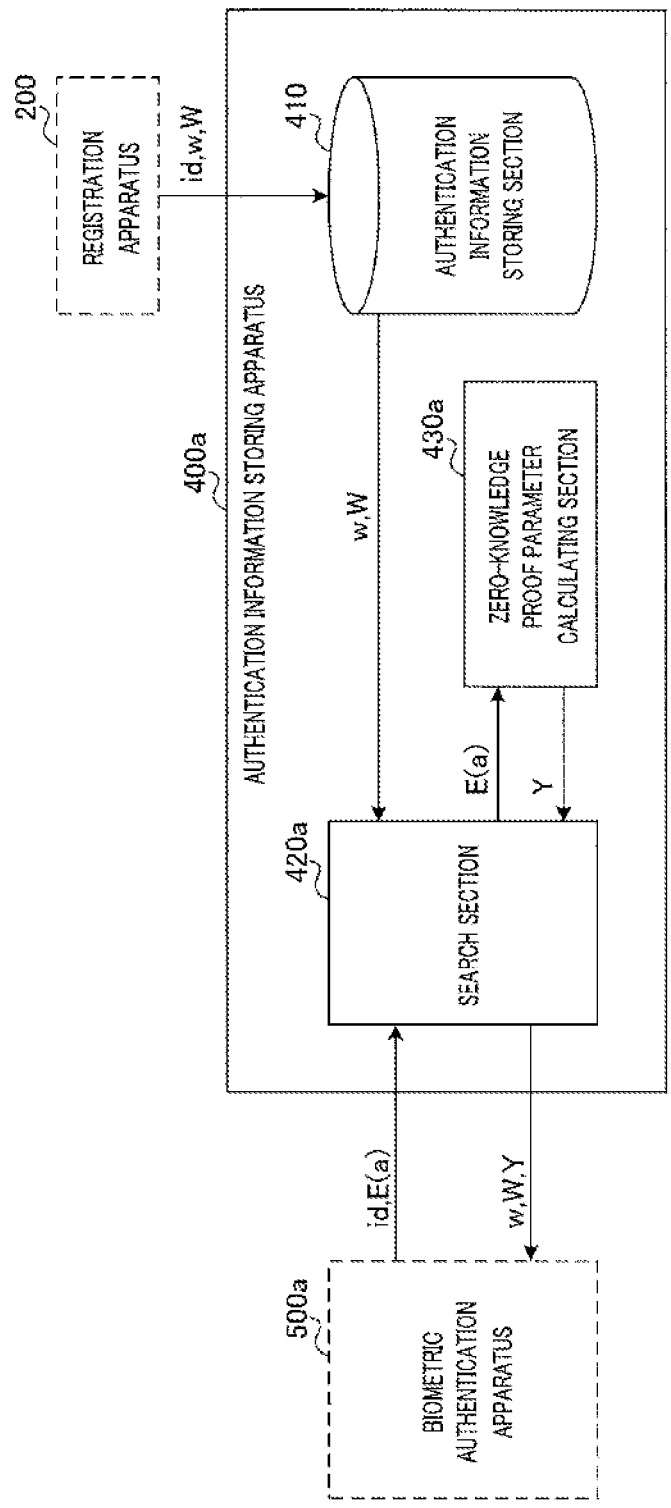
FIG. 12 is a block diagram illustrating the configuration of authentication information storing apparatus in Embodiment 2.

FIG. 12 is a block diagram illustrating the configuration of authentication information storing apparatus 400a, and it corresponds to FIG. 5 of Embodiment 1. The same components as shown in FIG. 5 are denoted by the same reference numerals as in FIG. 5, without redundant description.

As shown in FIG. 12, authentication information storing apparatus 400a includes new zero-knowledge proof parameter calculating section 430a and search section 420a different from that of Embodiment 1.

Search section 420a transfers information from/to biometric authentication apparatus 500a and zero-knowledge proof parameter calculating section 430a as well as retrieving information in authentication information storing section 410.

Zero-knowledge proof parameter calculating section 430a acquires random value encrypted information E(a) transmitted from communication terminal apparatus 300a via biometric authentication apparatus 500a and search section 420a. Zero-knowledge proof parameter calculating section 430a then decodes original random value a on the terminal side from random value encrypted information E(a) using encryption key K (see Equation 18), and calculates first verification information Y (see Equation 5). Zero-knowledge proof parameter calculating section 430a returns calculated first verification information Y to biometric authentication apparatus 500a via search section 420a.

The configuration of biometric authentication apparatus 500a will now be described.

Figure 13:
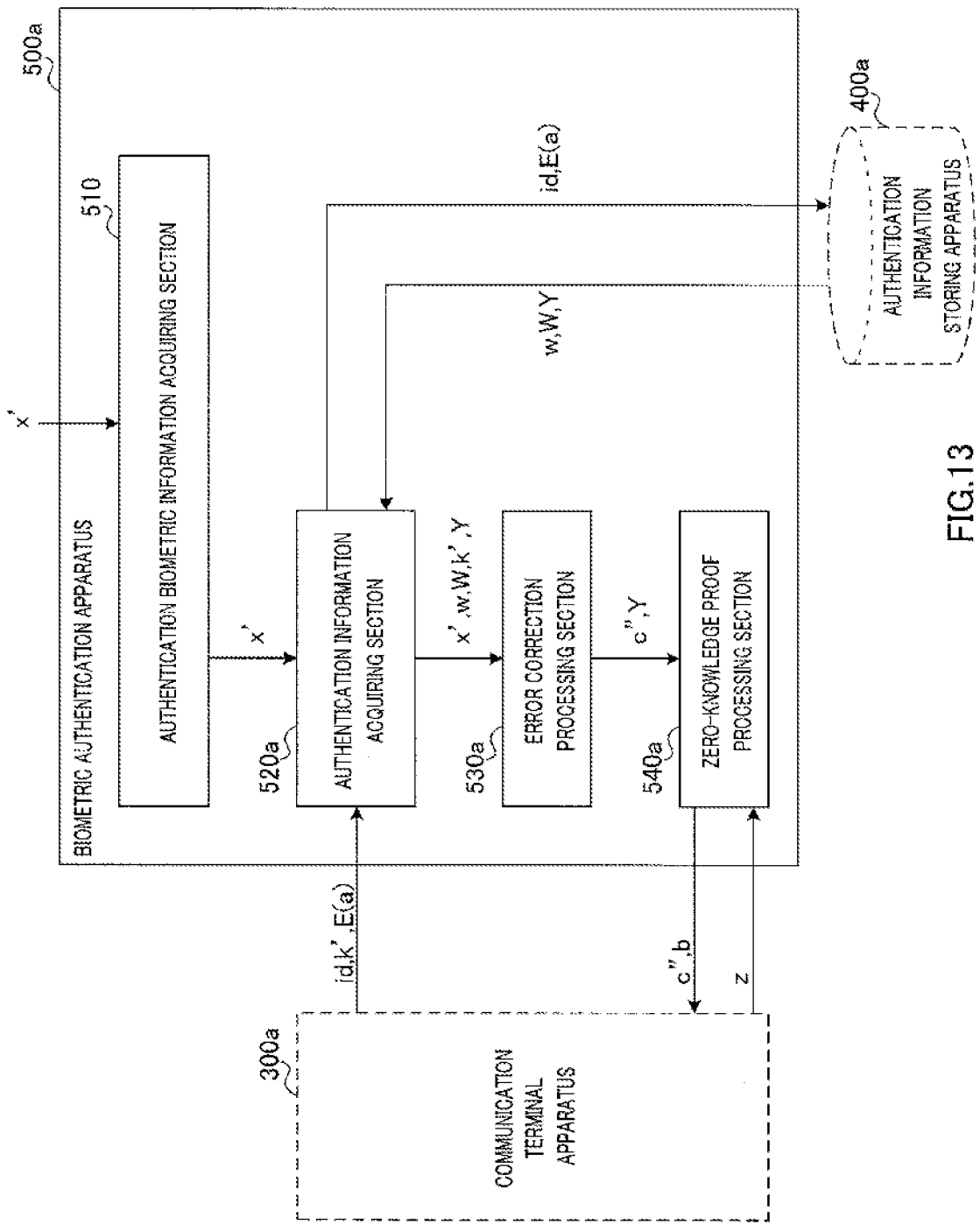
FIG. 13 is a block diagram illustrating the configuration of a biometric authentication apparatus according to Embodiment 2.

FIG. 13 is a block diagram illustrating the configuration of biometric authentication apparatus 500a, and it corresponds to FIG. 6 of Embodiment 1. The same component as shown in FIG. 6 is denoted by the same reference numeral as in FIG. 6, without redundant description.

As shown in FIG. 13, biometric authentication apparatus 500a includes authentication information acquiring section 520a, error correction processing section 530a, and zero-knowledge proof processing section 540a different from those of Embodiment 1.

Authentication information acquiring section 520a transmits random value encrypted information E(a) received from communication terminal apparatus 300a as well as ID information id to authentication information storing apparatus 400a. Authentication information acquiring section 520a receives returned first verification information Y as well as registration conversion template w and public key information W to output them to error correction processing section 530a.

Error correction processing section 530a outputs received first verification information Y as well as determined error corrected information c" to zero-knowledge proof processing section 540a.

Zero-knowledge proof processing section 540a acquires first verification information Y from error correction processing section 530a instead of from communication terminal apparatus 300a.

The operation of each apparatus different from Embodiment 1 will now be described.

The operation of communication terminal apparatus 300a is first described.

Figure 14:
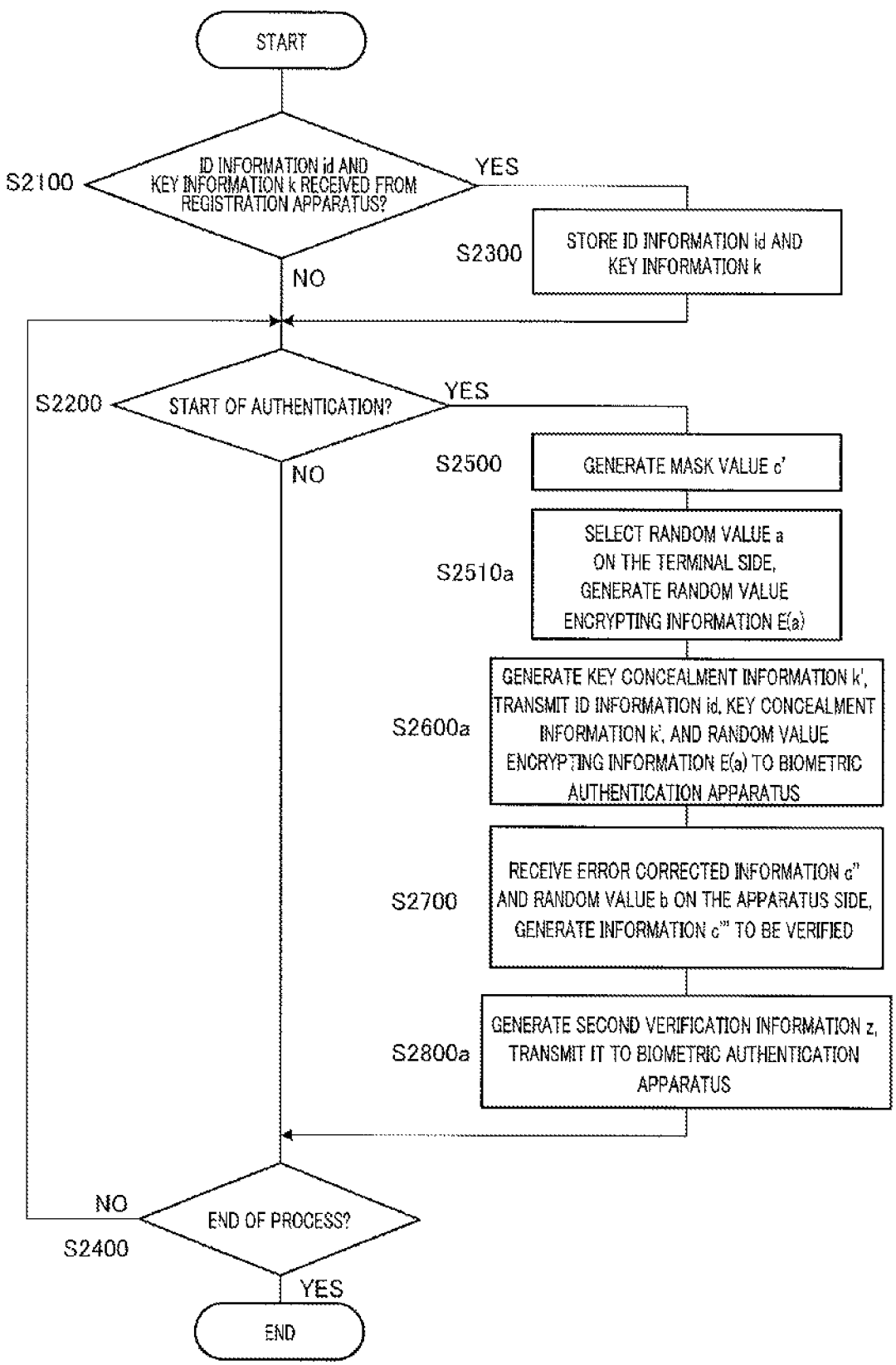
FIG. 14 is a flow chart representing the operation of the communication terminal apparatus according to Embodiment 2.

FIG. 14 is a flow chart representing the operation of communication terminal apparatus 300a, and it corresponds to FIG. 8 of Embodiment 1. The same steps as shown in FIG. 8 are denoted by the same reference numerals as in FIG. 8, without redundant description.

In step S2510a, random number generating section 360a selects random value a on the terminal side at the time of the authentication (see Equation 4), and generates random value encrypted information E(a) from random value a on the terminal side and encryption key K (see Equation 17). Random number generating section 360a also outputs selected random value a on the terminal side to zero-knowledge proving section 350a.

In step S2600a, key concealment section 330a generates key concealment information k' from mask value c' and the key information (see Equation 7), and transmits ID information id, key concealment information k', and random value encrypted information E(a) to biometric authentication apparatus 500a.

In step S2800a, zero-knowledge proving section 350a generates second verification information z on the basis of random value a on the terminal side received from random number generating section 360a, and random value b on the apparatus side and information c''' to be verified that are received from authentication parameter extracting section 340 (sec Equation 11). Zero-knowledge proving section 350a transmits generated second verification information z to biometric authentication apparatus 500a and then carries out step S2400.

The operation of authentication information storing apparatus 400a will now be described.

Search section 420a transfers information from/to biometric authentication apparatus 500a and zero-knowledge proof parameter calculating section 430a in parallel with searching for registration conversion template w and public key information W. In specific, search section 420a outputs random value encrypted information E(a) received from biometric authentication apparatus 500a to zero-knowledge proof parameter calculating section 430a. Search section 420a also sends first verification information Y received from zero-knowledge proof parameter calculating section 430a to biometric authentication apparatus 500a.

The operation of biometric authentication apparatus 500a will now be described.

Figure 15:
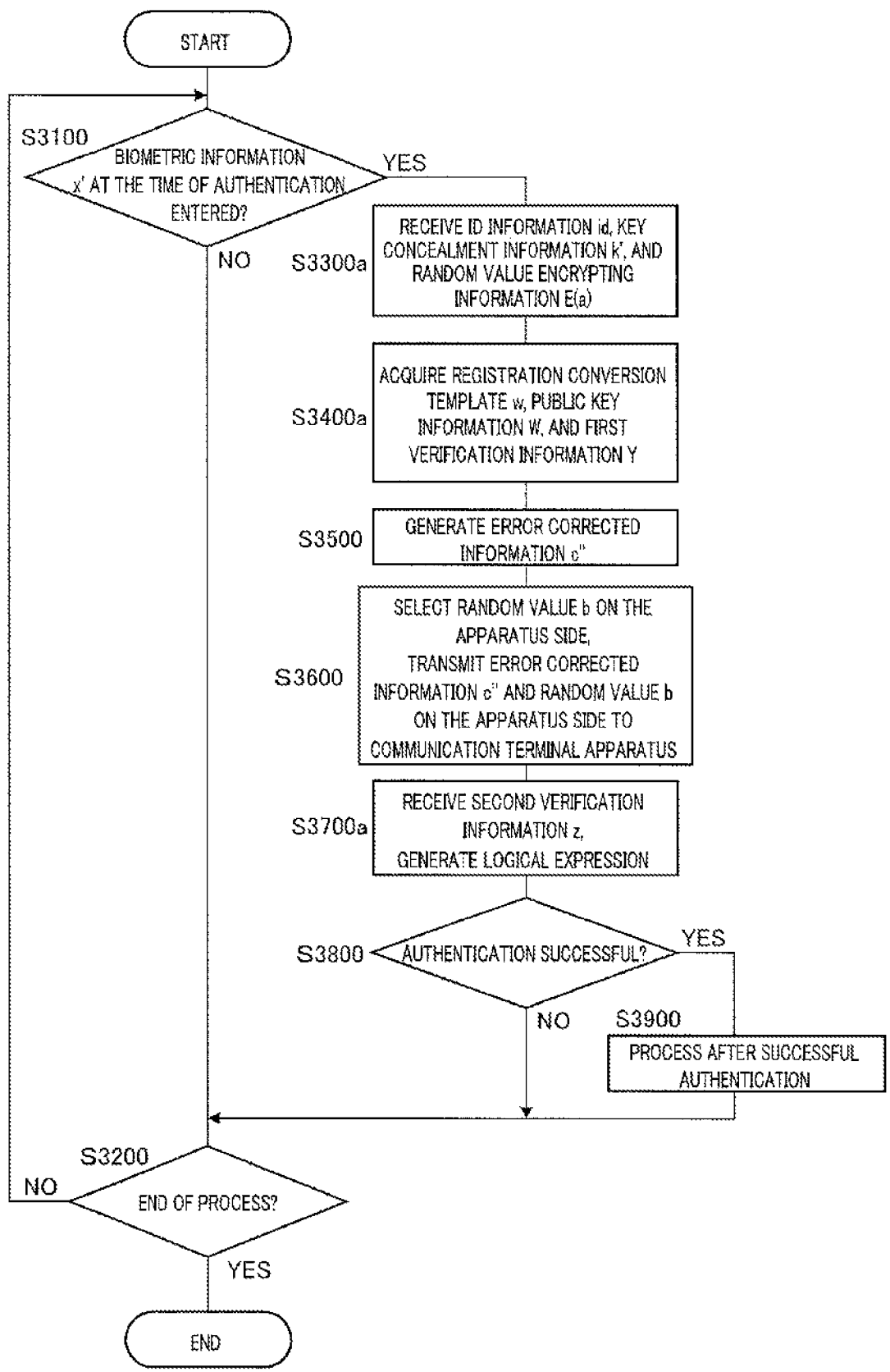
FIG. 15 is a flow chart representing the operation of the biometric authentication apparatus according to Embodiment 2.

FIG. 15 is a flow chart representing the operation of biometric authentication apparatus 500a, and it corresponds to FIG. 9 of Embodiment 1. The same steps as shown in FIG. 9 are denoted by the same reference numerals as in FIG. 9, without redundant description.

In step S3300a, authentication information acquiring section 520a receives random value encrypted information E(a) as well as ID information id and key concealment information k' from communication terminal apparatus 300a owned by an authenticatee. Authentication information acquiring section 520a then transfers received ID information id, key concealment information k', and random value encrypted information E(a) to authentication information storing apparatus 400a.

In step S3400a, authentication information acquiring section 520a acquires first verification information Y calculated from random value encrypted information E(a) as well as registration conversion template w and public key information W from authentication information storing apparatus 400a.

In step S3700a, zero-knowledge proof processing section 540a receives only second verification information z from communication terminal apparatus 300a to generate the logical expression in a zero-knowledge proof protocol (see Equation 12).

In such a manner, biometric authentication system 100a according to the present embodiment calculates first verification information Y in biometric authentication apparatus 500a (in authentication information storing apparatus 400a). Thus, biometric authentication system 100a according to the present embodiment can reduce the processing load of communication terminal apparatus 300a compared with Embodiment 1.

Embodiment 3

Embodiment 3 of the present invention describes Embodiment 2 further including an exemplary step for selecting mask value c' in the biometric authentication apparatus.

An overview of biometric authentication in a biometric authentication system according to the present embodiment will now be described.

Figure 16:
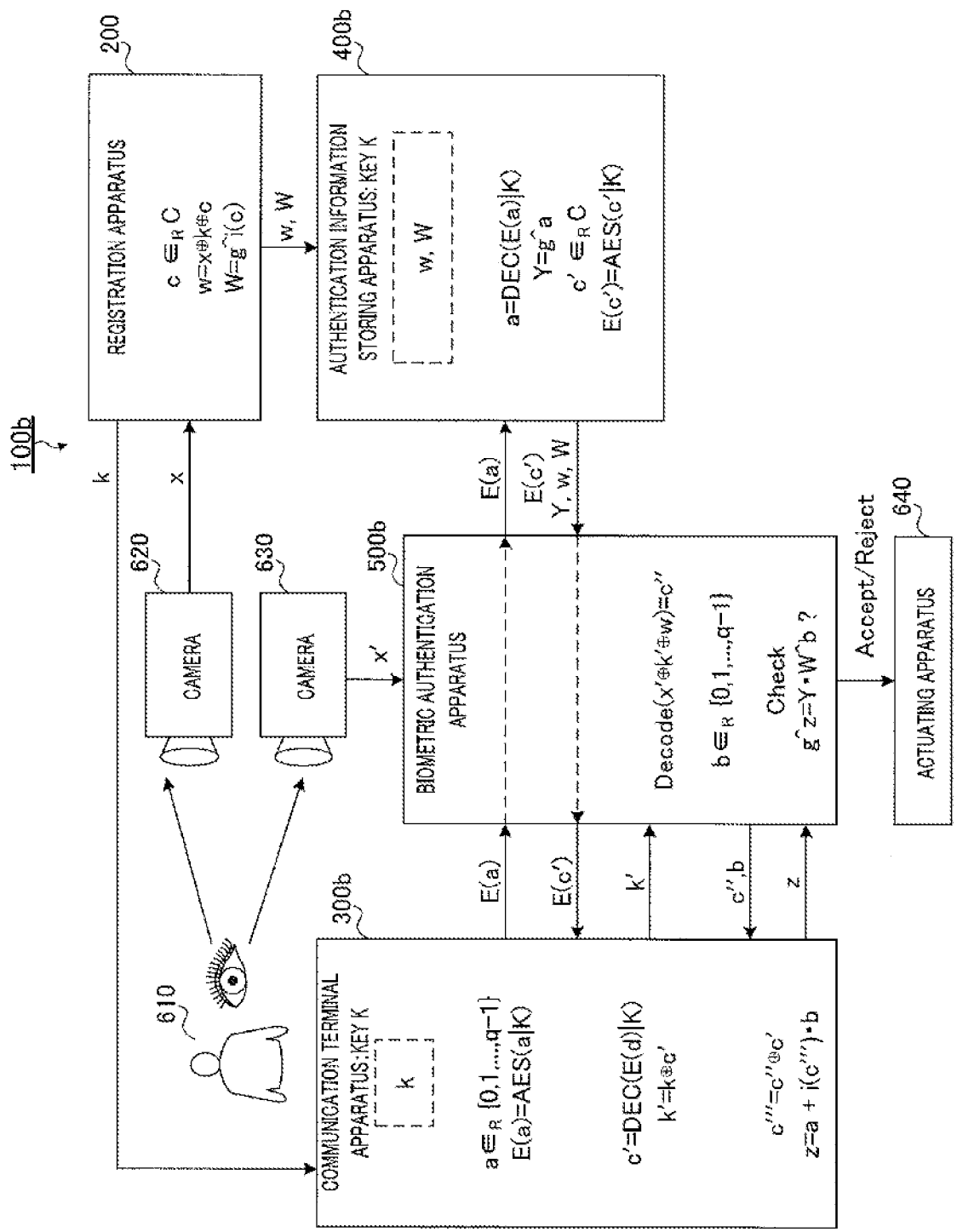
FIG. 16 illustrates an overview of biometric authentication in a biometric authentication system according to Embodiment 3 of the present invention.

FIG. 16 illustrates the overview of the biometric authentication in the biometric authentication system according to Embodiment 3 of the present invention, and it corresponds to FIG. 10 of Embodiment 2.

As shown in FIG. 16, biometric authentication system 100b according to the present embodiment includes communication terminal apparatus 300b, authentication information storing apparatus 400b, and biometric authentication apparatus 500b different from those of Embodiment 1, where the arrangement of apparatuses is the same as in Embodiment 2.

Communication terminal apparatus 300b first generates random value encrypted information E(a) with no selection of mask value c' and no generation of key concealment information k' (see Equation 17), and transmits random value encrypted information E(a) to authentication information storing apparatus 400b via biometric authentication apparatus 500b.

Authentication information storing apparatus 400b decodes original random value a on the terminal side from random value encrypted information E(a) (see Equation 18), and calculates first verification information Y (see Equation 5). Authentication information storing apparatus 400b also randomly selects mask value c' (see Equation 6). Authentication information storing apparatus 400b then calculates mask value encrypted information (error correction code encrypted information) E(c') that is the encrypted version of mask value c' using encryption key K as represented in Equation 19 below. Authentication information storing apparatus 400b transmits calculated mask value encrypted information E(c') to communication terminal apparatus 300b via biometric authentication apparatus 500b.

(Equation 19)

$$E(c')=AES(c'|K) \quad [19]$$

Communication terminal apparatus 300b decodes original mask value c' from mask value encrypted information E(c') using encryption key K as represented in Equation 20 below. Communication terminal apparatus 300b then generates key concealment information k' from decoded mask value c' (see Equation 7), and transmits it to biometric authentication apparatus 500b.

(Equation 20)

$$c'=DEC(E(c')|K) \quad [20]$$

Subsequent processes are the same as in Embodiment 2. Thus, biometric authentication system 100b according to the present embodiment can further reduce the processing load of communication terminal apparatus 300b compared with Embodiment 2.

The configuration of the components different from Embodiment 2 will now be described.

The configuration of communication terminal apparatus 300b is first described.

Figure 17:
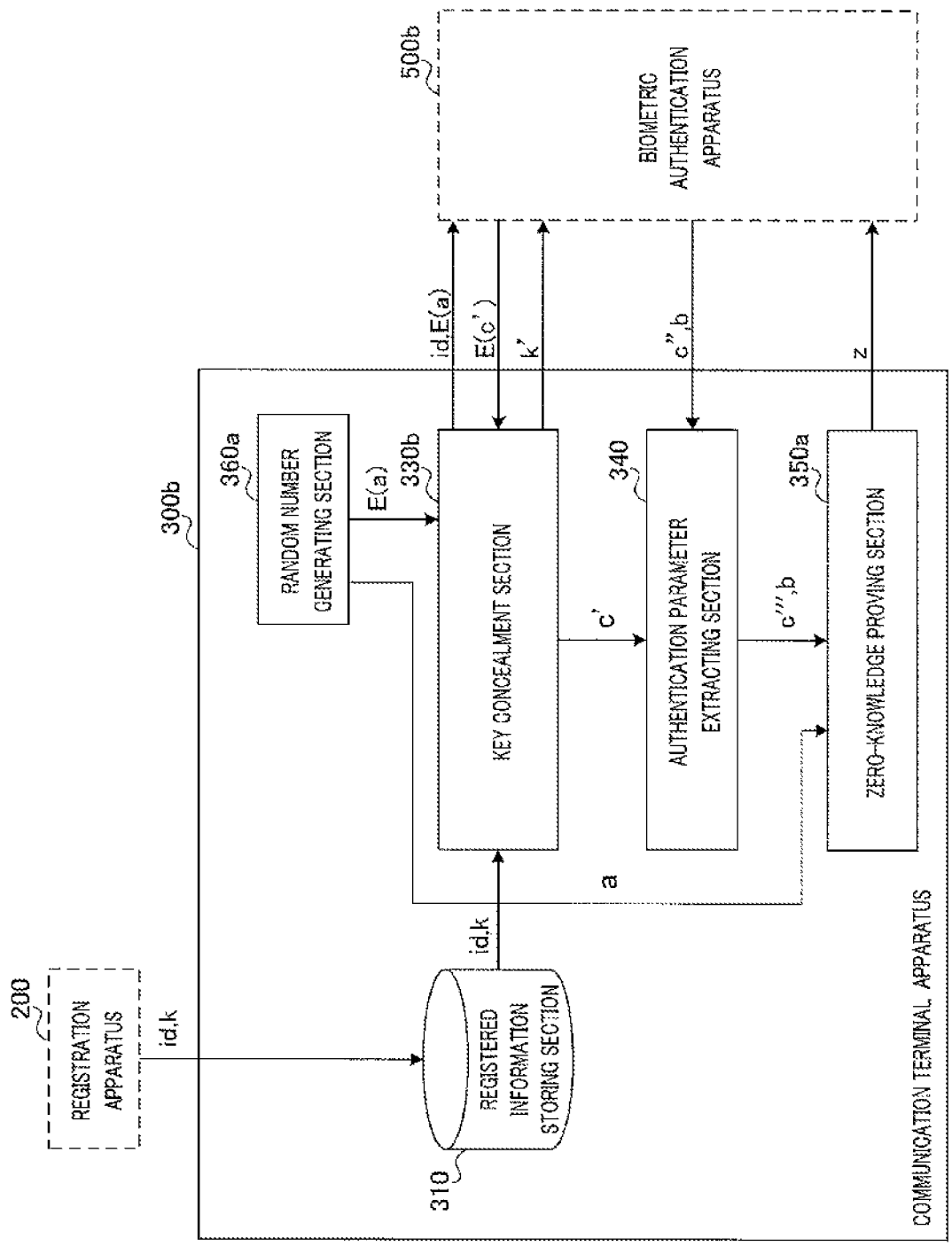
FIG. 17 is a block diagram illustrating the configuration of a communication terminal apparatus according to Embodiment 3.

FIG. 17 is a block diagram illustrating the configuration of communication terminal apparatus 300b, and it corresponds to FIG. 11 of Embodiment 2. The same components as shown in FIG. 11 are denoted by the same reference numerals as in FIG. 11, without redundant description.

As shown in FIG. 17, communication terminal apparatus 300b is not provided with mask value generating section 320 of Embodiment 2, whereas it includes key concealment section 330b different from the key concealment section of Embodiment 2.

At the time of authentication, key concealment section 330b first transmits ID information id and random value encrypted information E(a) to biometric authentication apparatus 500b. Upon receipt of mask value encrypted information E(c') from biometric authentication apparatus 500b, key concealment section 330b decodes mask value c' (see Equation 20). Key concealment section 330b then generates key concealment information k' (see Equation 7), and transmits key concealment information k' to biometric authentication apparatus 500b.

The configuration of authentication information storing apparatus 400b will now be described.

Figure 18:
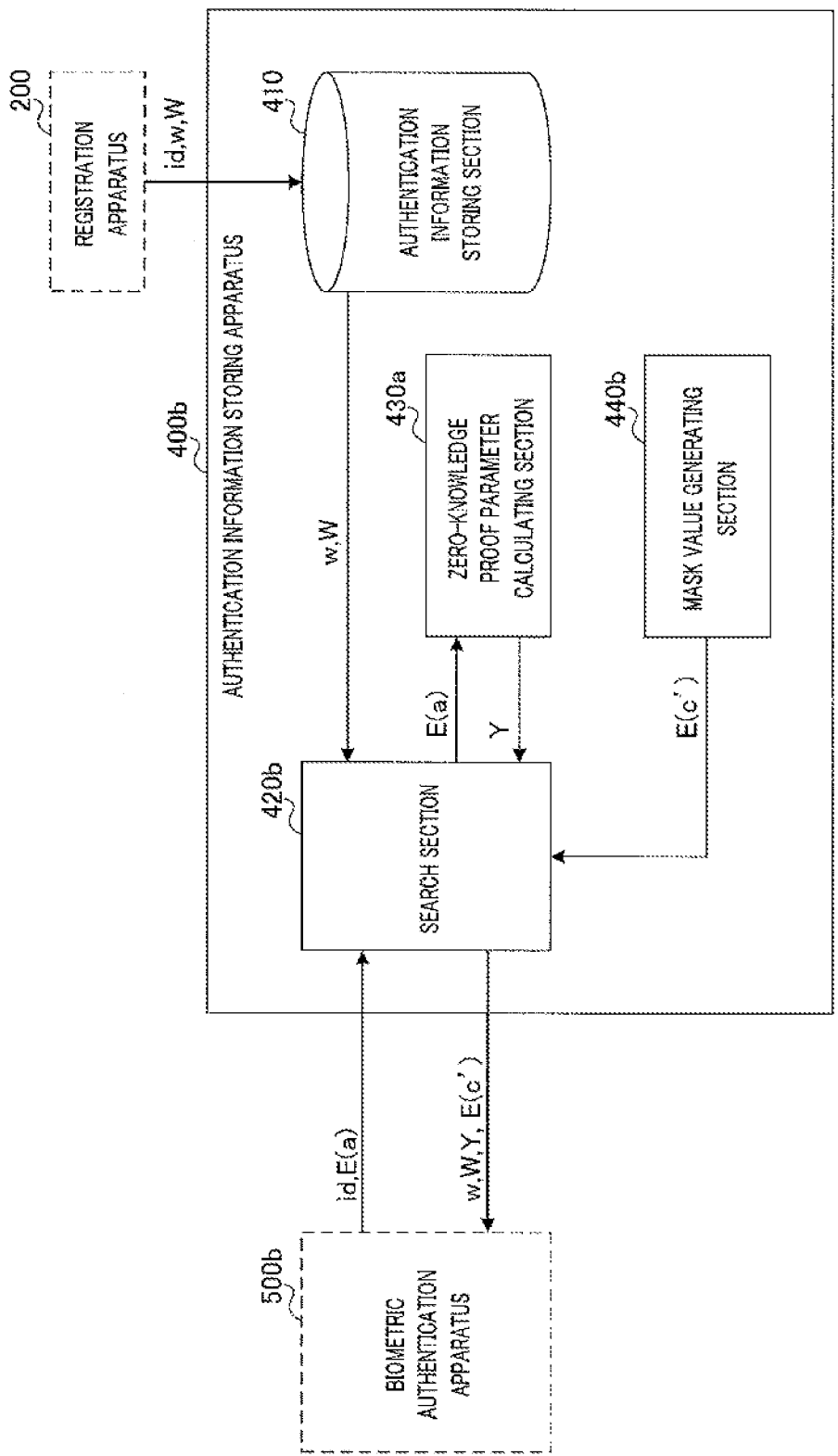
FIG. 18 is a block diagram illustrating the configuration of authentication information storing apparatus in Embodiment 3.

FIG. 18 is a block diagram illustrating the configuration of authentication information storing apparatus 400b, and it corresponds to FIG. 12 of Embodiment 2. The same components as shown in FIG. 12 are denoted by the same reference numerals as in FIG. 12, without redundant description.

As shown in FIG. 18, authentication information storing apparatus 400b includes new mask value generating section 440b and search section 420b different from that of Embodiment 2.

Mask value generating section 440b selects mask value c' (see Equation 6), and outputs mask value encrypted information E(c') that is the encrypted version of mask value c' to search section 420b. The selection of mask value c' and the output of mask value encrypted information E(c') are triggered, for example, by the request for authentication information from biometric authentication apparatus 500b.

Search section 420b transfers mask value encrypted information E(c') received from mask value generating section 440b to biometric authentication apparatus 500b as well as retrieving information in authentication information storing section 410 and transferring information from/to zero-knowledge proof parameter calculating section 430a.

The configuration of biometric authentication apparatus 500b will now be described.

Figure 19:
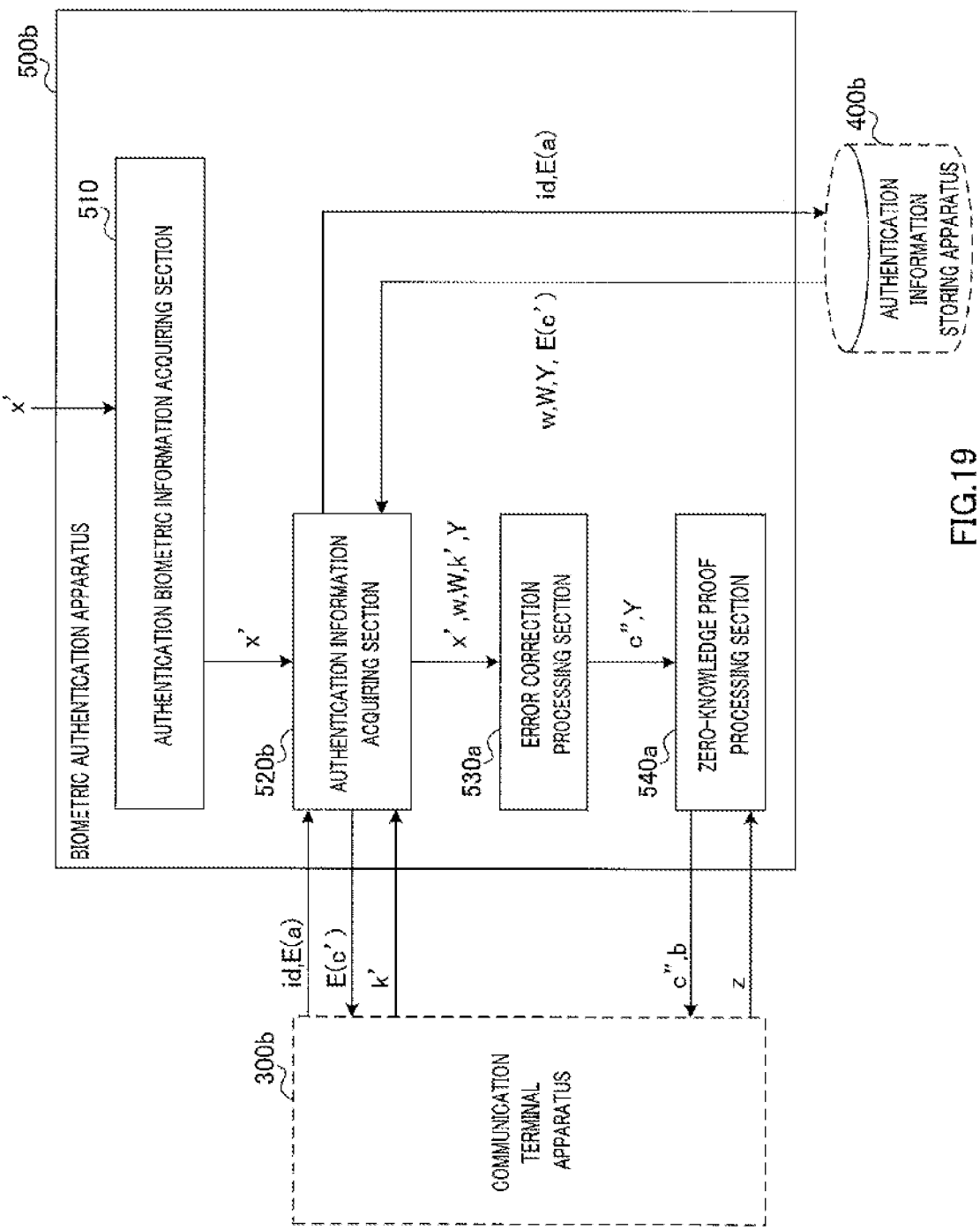
FIG. 19 is a block diagram illustrating the configuration of a biometric authentication apparatus according to Embodiment 3.

FIG. 19 is a block diagram illustrating the configuration of biometric authentication apparatus 500b, and it corresponds to FIG. 13 of Embodiment 2. The same components as shown in FIG. 13 are denoted by the same reference numerals as in FIG. 13, without redundant description.

As shown in FIG. 19, biometric authentication apparatus 500b includes authentication information acquiring section 520b different from that of Embodiment 2.

Authentication information acquiring section 520b sends ID information id and random value encrypted information E(a) to authentication information storing apparatus 400b. Authentication information acquiring section 520b receives mask value encrypted information E(c') from authentication information storing apparatus 400b in response to the sending. Authentication information acquiring section 520b then transmits received mask value encrypted information E(c') to communication terminal apparatus 300b. Authentication information acquiring section 520b receives key concealment information k' from communication terminal apparatus 300b in response to the transmission. Authentication information acquiring section 520b outputs received key concealment information k', registration conversion template w, public key information W and first verification information Y received from authentication information storing apparatus 400b, and biometric information x' at the time of authentication to error correction processing section 530a.

The operation of each apparatus different from Embodiment 2 will now be described.

The operation of communication terminal apparatus 300b is first described.

Figure 20:
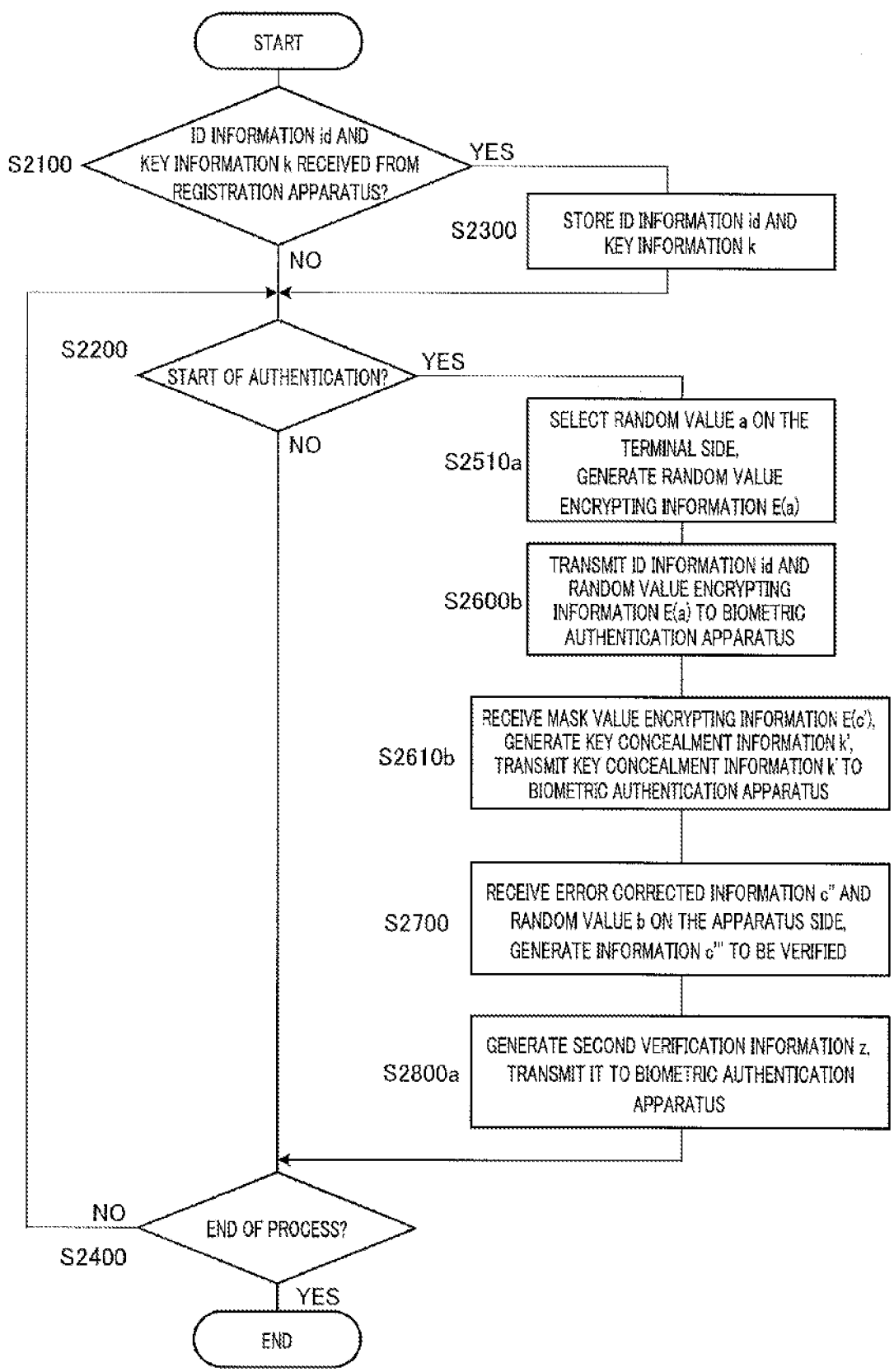
FIG. 20 is a flow chart representing the operation of the communication terminal apparatus according to Embodiment 3.

FIG. 20 is a flow chart representing the operation of communication terminal apparatus 300b, and it corresponds to FIG. 14 of Embodiment 2. The same steps as shown in FIG. 14 are denoted by the same reference numerals as in FIG. 14, without redundant description.

In step S2600b, key concealment section 330b first transmits only ID information id and random value encrypted information E(a) to biometric authentication apparatus 500b.

In step S2610b, key concealment section 330b receives mask value encrypted information E(c') to decode mask value c' (see Equation 20), and generates key concealment information k' (see Equation 7). Key concealment section 330b transmits generated key concealment information k' to biometric authentication apparatus 500b, and then carries out step S2700.

The operation of authentication information storing apparatus 400b will now be described.

Upon each receipt of ID information id from biometric authentication apparatus 500b (i.e., upon each authentication attempt), mask value generating section 440b selects mask value c' (see Equation 6). Mask value generating section 440b then generates mask value encrypted information E(c') (see Equation 19), and outputs it to search section 420b. Search section 420b transfers mask value encrypted information E(c') in parallel with searching for registration conversion template w and public key information W, and transferring random value encrypted information E(a) and first verification information Y. In specific, each time mask value encrypted information E(c') is input, search section 420b sends input mask value encrypted information E(c') to biometric authentication apparatus 500b.

The operation of biometric authentication apparatus 500b will now be described.

Figure 21:
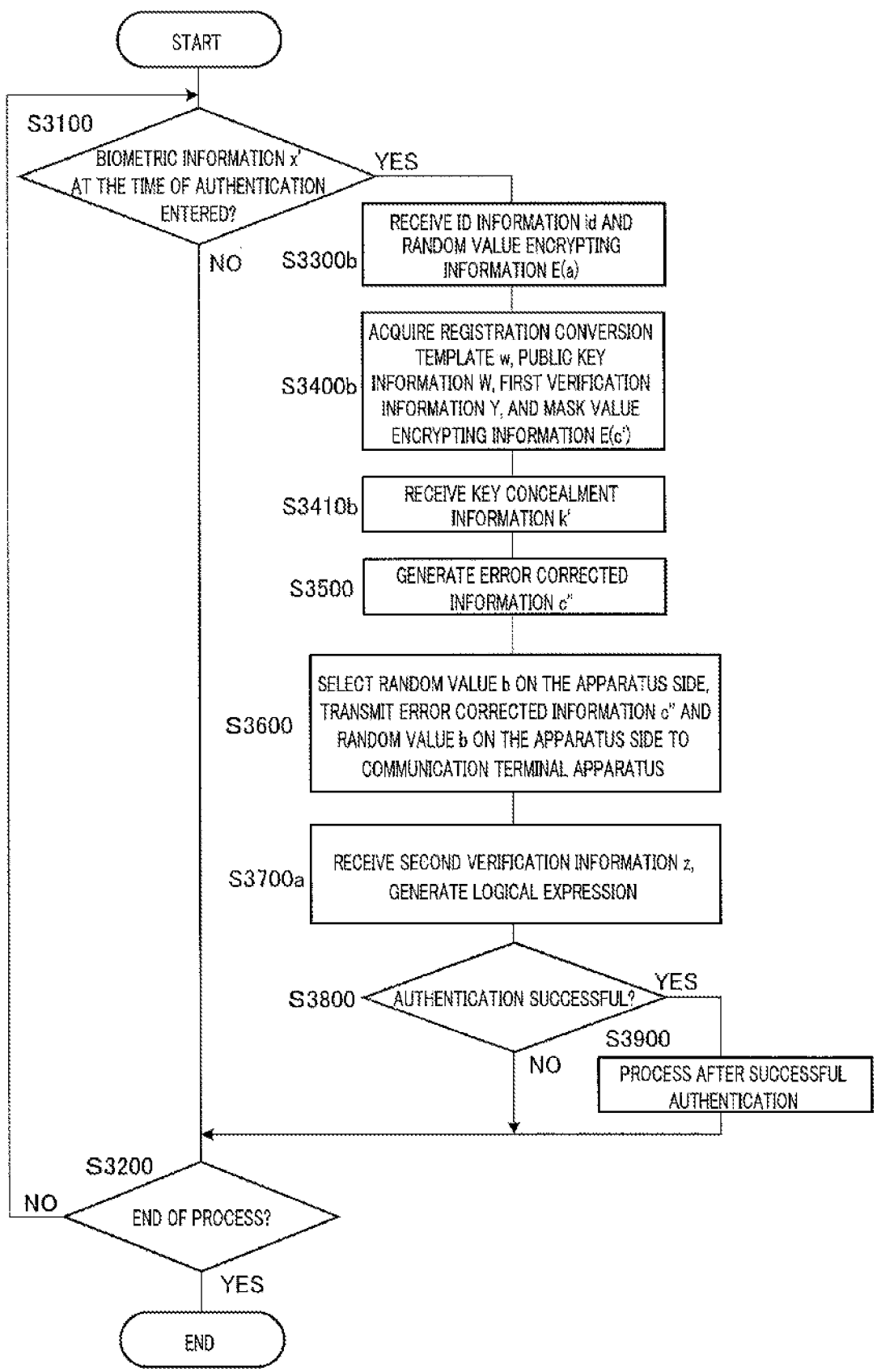
FIG. 21 is a flow chart representing the operation of the biometric authentication apparatus according to Embodiment 3.

FIG. 21 is a flow chart representing the operation of biometric authentication apparatus 500b, and it corresponds to FIG. 15 of Embodiment 2. The same steps as shown in FIG. 15 are denoted by the same reference numerals as in FIG. 15, without redundant description.

In step S3300b, authentication information acquiring section 520b first receives ID information id and random value encrypted information E(a) from communication terminal apparatus 300b. Authentication information acquiring section 520b transfers received ID information id and random value encrypted information E(a) to authentication information storing apparatus 400b.

In step S3400b, authentication information acquiring section 520b acquires mask value encrypted information E(c') as well as registration conversion template w, public key information W and first verification information Y from authentication information storing apparatus 400b. Authentication information acquiring section 520b then transfers mask value encrypted information E(c') to communication terminal apparatus 300b.

In step S3410b, authentication information acquiring section 520b receives key concealment information k' generated on the basis of mask value encrypted information E(c') from communication terminal apparatus 300b.

In such a manner, biometric authentication system 100b according to the present embodiment selects mask value c' in biometric authentication apparatus 500b (in authentication information storing apparatus 400b). Thus, biometric authentication system 100b according to the present embodiment can reduce the processing load of communication terminal apparatus 300b compared with Embodiment 2.

Information c''' to be verified is concealed using zero-knowledge proof in the above-described embodiments. Concealment of information c''', however, is not essential. In such a case, biometric authentication apparatus 500 can directly determine the correspondence between acquired authentication parameter c and information c''' to be verified that is received from communication terminal apparatus 300.

The communication terminal apparatus according to the present invention may be connected to biometric authentication apparatus 500 via a wired connection, instead of wireless communication.

Biometric authentication system 100 identifies the authentication information corresponding to the communication terminal apparatus on the basis of ID information id. Identification of the authentication information corresponding to the communication terminal apparatus by biometric authentication system 100, however, is not essential in the case of brute-force authentication processing, for example.

Two or all of registration apparatus 200, authentication information storing apparatus 400, and biometric authentication apparatus 500 may be integrated.

The disclosure of Japanese Patent Application No. 2010-221379, filed on Sep. 30, 2010, including the specification, drawings and abstract, is incorporated herein by reference in its entirety.

INDUSTRIAL APPLICABILITY

The biometric authentication system, communication terminal apparatus, biometric authentication apparatus, and method of biometric authentication according to the present invention effectively prevent spoofing attacks even in case of leak of key information stored in the communication terminal apparatus and registration conversion template.

REFERENCE SIGNS LIST 100, 100a, 100b Biometric authentication system
200 Registration apparatus
210 Registration biometric information acquiring section
220 ID issuing section
230 Key issuing section
240 Authentication parameter generating section
250 Authentication information generating section
260 Registration section
300, 300a, 300b Communication terminal apparatus
310 Registered information storing section
320 Mask value generating section
330, 330a, 330b Key concealment section
340 Authentication parameter extracting section
350, 350a Zero-knowledge proving section
360a Random number generating section
400, 400a, 400b Authentication information storing apparatus
410 Authentication information storing section
420, 420a, 420b Search section
430a Zero-knowledge proof parameter calculating section
440b Mask value generating section
500, 500a, 500b Biometric authentication apparatus
510 Authentication biometric information acquiring section
520, 520a, 520b Authentication information acquiring section
530, 530a Error correction processing section
540, 540a Zero-knowledge proof processing section
620, 630 Camera
640 Actuating apparatus

The invention claimed is:

1. A biometric authentication system comprising:
a communication terminal apparatus owned by a user subjected to biometric authentication; and
a biometric authentication apparatus that performs the biometric authentication,
the communication terminal apparatus comprising:
a registered information storing section that stores key information issued in association with biometric information at the time of registration of the user;
a key concealment section that performs an exclusive OR operation of the stored key information and a first error correction code to calculate key concealment information, the first error correction code being randomly selected from a predetermined error correction code group; and
an authentication parameter extracting section that performs an exclusive OR operation of a calculated error corrected information received from the biometric authentication apparatus and the first error correction code to calculate an information to be verified that is transmitted to a verification processing section of the biometric authentication apparatus, and
the biometric authentication apparatus comprising:
an authentication biometric information acquiring section that acquires biometric information at the time of authentication from a person asking for biometric authentication;
an authentication information acquiring section that acquires the key concealment information from the communication terminal apparatus owned by the person;
an error correction processing section that calculates the error corrected information on the basis of an exclusive OR of the acquired biometric information at the time of the authentication, the acquired key concealment information, and a registration conversion template,
wherein the registration conversion template is calculated on the basis of an exclusive OR of the biometric information at the time of the registration, the key information, and a second error correction code randomly selected from the error correction code group, and
wherein the error corrected information is transmitted to the authentication parameter extracting section after the error corrected information is calculated; and
a verification processing section that transmits the calculated error corrected information to the communication terminal apparatus and, after receiving the information to be verified from the authentication parameter extracting section, performs the biometric authentication on the basis of the degree of identity between the calculated information to be verified and the second error correction code used to calculate the error corrected information.

2. The biometric authentication system according to claim 1, wherein:
the communication terminal apparatus further comprises a verification information generating section that generates information obtained by concealing the information to be verified as information for verification, and
the verification processing section of the biometric authentication apparatus acquires the information for verification from the communication terminal apparatus owned by the person, and determines the degree of the identity on the basis of the acquired information for verification and public key information, the public key information being information obtained by concealing the second error correction code.

3. The biometric authentication system according to claim 2, wherein:
the public key information is a value represented by an exponential expression with an integer corresponding to the second error correction code as the exponent and a generator of a given multiplicative group as the base,
the information for verification includes second information for verification and first information for verification, the second information for verification being the sum of the product of an integer corresponding to the information to be verified and a first random value transmitted from the biometric authentication apparatus, and a second random value known by only the communication terminal apparatus, the first information for verification being a value represented by an exponential expression with the second random value as the exponent and the generator of the multiplicative group as the base, and
the verification processing section performs the biometric authentication on the basis of the identity between the value represented by an exponential expression with the second information for verification as the exponent and the generator of the multiplicative group as the base, and a product of the value represented by an exponential expression with the first random value as the exponent and the public key information as the base and the first information for verification.

4. The biometric authentication system according to claim 3, wherein:
the key concealment section transmits random value encrypted information being an encrypted version of the second random value to the biometric authentication apparatus, and
the authentication information acquiring section acquires the first information for verification on the basis of the random value encrypted information received from the communication terminal apparatus.

5. The biometric authentication system according to claim 4, wherein:
the authentication information acquiring section acquires error correction code encrypted information being an encrypted version of the first error correction code on the basis of the random value encrypted information received from the communication terminal apparatus, and transmits the acquired error correction code encrypted information to the communication terminal apparatus, and
the key concealment section acquires the first error correction code on the basis of the error correction code encrypted information received from the biometric authentication apparatus.

6. A communication terminal apparatus used in a biometric authentication system comprising the communication terminal apparatus owned by a user subjected to biometric authentication and a biometric authentication apparatus that performs the biometric authentication, the communication terminal apparatus comprising:
a registered information storing section that stores key information issued in association with biometric information at the time of registration of the user;
a key concealment section that:
performs an exclusive OR operation of the stored key information and a first error correction code to calculate key concealment information, the first error correction code being randomly selected from a predetermined error correction code group, and
transmits the calculated key concealment information to the biometric authentication apparatus;
an authentication parameter extracting section that:
acquires error corrected information, the error corrected information being calculated by the biometric authentication apparatus when the user asks for the biometric authentication, wherein the error corrected information is calculated on the basis of an exclusive OR of biometric information at the time of authentication the transmitted key concealment information, and a registration conversion template,
wherein the registration conversion template is calculated on the basis of an exclusive OR of the biometric information at the time of the registration, the stored key information, and a second error correction code randomly selected from the error correction code group, and
performs an exclusive OR operation of the acquired error corrected information and the first error correction code to calculate information to be verified that is transmitted to a verification processing section of the biometric authentication apparatus; and
a verification information generating section that generates information for verification obtained by concealing the calculated information to be verified and transmits the generated information for verification to the biometric authentication apparatus.

7. A biometric authentication apparatus used in a biometric authentication system comprising a communication terminal apparatus owned by a user subjected to biometric authentication and the biometric authentication apparatus that performs the biometric authentication, the biometric authentication apparatus comprising:
an authentication biometric information acquiring section that acquires biometric information at the time of authentication from a person asking for biometric authentication;
an authentication information acquiring section that acquires key concealment information from a communication terminal apparatus owned by the person, wherein the acquired key concealment information is calculated on the basis of an exclusive OR operation of the stored key information and a first error correction code, the first error correction code being randomly selected from a predetermined error correction code group;
an error correction processing section that calculates error corrected information on the basis of an exclusive OR of the acquired biometric information at the time of the authentication, the acquired key concealment information, and a registration conversion template,
wherein the registration conversion template is calculated on the basis of an exclusive OR of the biometric information at the time of registration, key information issued in association with the biometric information at the time of the registration, and a second error correction code randomly selected from an error correction code group; and
a verification processing section that:
transmits the calculated error corrected information to the communication terminal apparatus, and
after receiving the information to be verified from the authentication parameter extracting section, performs the biometric authentication on the basis of the degree of identity between the calculated information to be verified and the second error correction code,
wherein the calculated information to be verified is calculated by the communication terminal apparatus in response to receipt by the communication terminal apparatus of the transmitted calculated error corrected information and the second error correction code, and
wherein the calculated information to be verified is calculated by an exclusive OR operation of the calculated error corrected information received from the biometric authentication apparatus and the first error correction code.

8. A method of biometric authentication used in a biometric authentication system comprising a communication terminal apparatus owned by a user subjected to biometric authentication and a biometric authentication apparatus that performs the biometric authentication, the method of biometric authentication comprising:
  performing, using the communication terminal apparatus, an exclusive OR operation of key information issued in association with biometric information at the time of registration of the user and a first error correction code to calculate key concealment information, the first error correction code being randomly selected from a predetermined error correction code group;
  acquiring, using the biometric authentication apparatus, biometric information at the time of authentication from a person asking for biometric authentication;
  acquiring, using the biometric authentication apparatus, the key concealment information from the communication terminal apparatus owned by the person;
  calculating, using the biometric authentication apparatus, error corrected information on the basis of an exclusive OR of the acquired biometric information at the time of the authentication, the acquired key concealment information, and a registration conversion template,
    wherein the registration conversion template is calculated on the basis of an exclusive OR of the biometric information at the time of the registration, the key concealment information, and a second error correction code randomly selected from the error correction code group;
  transmitting, using the biometric authentication apparatus, the calculated error corrected information to the communication terminal apparatus;
  performing, using the communication terminal apparatus, an exclusive OR operation of the calculated error corrected information transmitted from the biometric authentication apparatus and the first error correction code to calculate information to be verified; and
  transmitting, using the communication terminal apparatus, information for verification calculated from the information to be verified to the biometric authentication apparatus; and
  performing, using the biometric authentication apparatus, the biometric authentication on the basis of the degree of identity between the information for verification calculated on the basis of the transmitted error corrected information and the second error correction code used to calculate the error corrected information.

* * * * *